United States Patent
Sudoh

(10) Patent No.: US 7,372,636 B2
(45) Date of Patent: May 13, 2008

(54) ZOOM LENS AND IMAGE-TAKING DEVICE

(75) Inventor: Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/700,784

(22) Filed: Feb. 1, 2007

(65) Prior Publication Data

US 2007/0201144 A1      Aug. 30, 2007

(30) Foreign Application Priority Data

Feb. 28, 2006    (JP)    .............................. 2006-052862

(51) Int. Cl.
G02B 15/14        (2006.01)
(52) U.S. Cl. .................................................... 359/687
(58) Field of Classification Search ............... 359/686, 359/687
See application file for complete search history.

(56) References Cited

U.S. PATENT DOCUMENTS 7,061,686 B2 *  6/2006  Ohtake ........................ 359/687

FOREIGN PATENT DOCUMENTS

| JP | 2004-199000 | 7/2004 |
|---|---|---|
| JP | 2004-286811 | 10/2004 |
| JP | 2004-354870 | 12/2004 |
| JP | 2005-181556 | 7/2005 |
| JP | 2007-108531 | 4/2007 |
| JP | 2007-178846 | 7/2007 |

* cited by examiner

*Primary Examiner*—Huy Mai
*Assistant Examiner*—Jack Dinh
(74) *Attorney, Agent, or Firm*—Harness, Dickey & Pierce, P.L.C.

(57) ABSTRACT

A zoom lens including subsequently from an object side of the zoom lens to an image side of the zoom lens: a first lens group with a positive focal length; a second lens group with a negative focal length, an aperture arranged on an object side of a third lens group; the third lens group with a positive focal length, a forth lens group with a positive focal length. By zooming from a short focal end to a long focal end, an interval between the first lens group and the second lens group increases, an interval between the second lens group and the third lens group decreases, an interval between the third lens group and the fourth lens group increases. The first lens group has sequentially from an object side of the first lens group: a negative meniscus lens L1 having a convex surface facing the object; a positive lens L2; satisfying a conditional expression: Nd11>1.96 (Nd11: a refractive index of the negative meniscus lens L1.

9 Claims, 17 Drawing Sheets

ZOOM LENS AND IMAGE-TAKING DEVICE

BACKGROUND

1. Field of the Invention

The present invention relates to a zoom lens capable of changing a focal length by moving lens groups along an optical axial direction back and forth and an image-taking device equipped with the zoom lens, more specifically to a zoom lens especially suitable for a digital camera, a portable terminal device, a video camera and or the like and an image-taking device equipped with the zoom lens.

In recent years, the digital camera having a changeable focus mechanism such as a zoom lens camera barrel or the like is commonly available. The changeable focus mechanism can change continuously between a wide angle state and a telescopic angle state. The wide-angle state is that a focal length of a photographing lens is short and an angle of field is wide. The telescopic angle state is that the focal length of the photographing lens is long and the angle of field is narrow.

As for the digital cameras in recent years, a better picture, miniaturizing, more of the wide angle, more of a large caliber, and or the like are desired in a market.

Moreover, the better picture, miniaturizing, more of the wide angle and more of the large caliber for corresponding to a light detecting element which exceeds three million pixels are requested. The miniaturization means reducing a storage length of the lens, a total length of the lens, and a maximum of an effective diameter or the like.

2. Description of the Related Art

So, as a technical document filed earlier than the present invention, for example, Japanese Patent Publication No. 2004-354870 discloses a zoom lens of rear focus type which includes as follows: a first lens group that has a positive refracting power; a second lens group that has a negative refracting power; a third lens group that has a positive refracting power; a fourth lens group that has a positive refracting power; a fifth lens group that has a negative refracting power. The zoom lens is configured to zoom by moving the second lens group and the fourth lens group. When a distance of object is infinity and an image formation magnification of the fifth lens group is set to be β5 simultaneously, the zoom lens satisfies a condition of $1.6<\beta 5<2.2$. An excellent optical performance is obtained if a zooming ratio is set about 3-5 times. An entire system of the lens is miniaturized.

Moreover, Japanese Patent Publication No. 2004-286811 discloses a zoom lens that includes as follows sequentially from an object side of the zoom lens to an image side of the zoom lens: a first lens group that has a positive refracting power and doesn't move along with a zooming; a second lens group which has a negative refracting power and moves from the object side of the zoom lens to the image side of the zoom lens along with the zooming from a wide angle end to a telephoto end; a third lens group that has a positive refracting power and moves from the image side of the zoom lens to the object side of the zoom lens from the wide angle end to the telephoto end along with the zooming; a fourth lens group that has a positive refracting power and doesn't move along with the zooming. The third lens group has a three piece cemented lens that consists of a negative lens, a positive lens and a negative lens. Even though the zoom lens is small enough with a wide angle of field, the zoom lens is efficient, and the lens enables it to obtain a resolving power corresponding to an image sensor of 3-5 million pixels.

Moreover, Japanese Patent Publication No. 2004-199000 discloses a zoom lens that includes as follows: from an object side of the zoom lens sequentially, a first lens group that has a positive refracting power; a second lens group that has a negative refracting power; a third lens group that has a positive refracting power; a fourth lens group that has a positive refracting power. The first lens group consists only of one positive lens. During zooming from a wide angle end to a telephoto end, all the lens groups are moved in such a way that an interval between the first lens group and the second lens group increases, an interval between the second lens group and the third lens group decreases and an interval between the third lens group and the fourth lens group increases. At the same time, the third lens group and the fourth lens group are moved in a direction to the object side of the zoom lens. The zoom lens satisfies following conditional expressions: $5.0<f1/fw<9.5$, $-2.2<f2/fw<-1.2$ and $0.4<f3/f4<1.5$ (fw: a focal length of all zoom lens groups in a state of the wide angle end. F1: a focal length of the first lens group. F2: a focal length of the second lens group. F3: a focal length of the third lens group. F4: a focal length of the fourth lens group.). The zoom lens is suitable for a video camera or the like using a solid state image sensor or the like. The zoom lens is small and has a zoom factor about three times. In the zoom lens, an angle of field in the state of the wide angle end is 60 degrees or more and F number is about F2-F2.8. So, the zoom lens has an excellent image formation performance.

Moreover, Japanese Patent Publication No. 2005-181556 discloses a large caliber zoom lens that includes from an object side of the zoom lens sequentially as follows: a first lens group with a positive refracting power; a second lens group with a negative refracting power; a third lens group with a positive refracting power; and a fourth lens group with a positive refracting power. By a zooming, an interval between the first lens group and the second lens group extends, an interval between the second lens group and the third lens group narrows, and an interval between the third lens group and the fourth lens group narrows. The second lens group is moved to the object side of the zoom lens in a focusing. The lens satisfies following conditional expressions: (1) $0.5<f2/fW<1.0$; (2) $0.5<f3/fT<2.0$; (3) $0.5<f4/fW<2.0$; (fW: a focal length of all optical systems in a wide angle end side. fT: the focal length of all optical systems in a telephoto side. f2: a focal length of the second lens group. f3: a focal length of the third lens group. f4: a focal length of the fourth lens group).

It is possible for the zoom lens disclosed in patent document 1 to correspond to the wide angle of field where the half field angle is about 38 degrees, but not to 2.5 or less in F number in a short focal end, and the first lens group is a thick structure. The 38 degrees in the half field angle corresponds to 28 mm of a focal length in a 35 mm silver bromide film camera, so-called Leica seal camera.

The zoom lenses disclosed in the patent documents 2 and 4 can correspond to the wide angle of field where the half field angle is 38 degrees or more, but can not correspond to 2.5 or less in F number of the short focal ends.

The zoom lens disclosed in above-mentioned patent document 3 can correspond to 2.5 or less in F number of the wide angle ends, but can not correspond to the wide angle of field where the half field angle is 38 degrees or more.

SUMMARY OF THE INVENTION

An object of the present invention is to provide a zoom lens capable of corresponding to a wide angle of field where the half field angle is 38 degrees or more and to 2.5 or less in F number of the short focal end and an image-taking device including the zoom lens.

To accomplish the above object, a zoom lens according to one embodiment of the present invention includes subsequently from an object side of the zoom lens to an image side of the zoom lens: a first lens group with a positive focal length; a second lens group with a negative focal length, an aperture arranged on an object side of a third lens group; the third lens group with a positive focal length, a forth lens group with a positive focal length. By zooming from a short focal end to a long focal end, an interval between the first lens group and the second lens group increases, an interval between the second lens group and the third lens group decreases, an interval between the third lens group and the fourth lens group increases. The first lens group has sequentially from an object side of the first lens group: a negative meniscus lens L1 having a convex surface facing the object; a positive lens L2; satisfying a conditional expression: Nd11>1.96 (Nd11: a refractive index of the negative meniscus lens L1).

BRIEF DESCRIPTION OF THE DRAWINGS

FIG. 1A is a cross sectional view illustrating a composition of a zoom lens installed in an image-taking device of the first embodiment.

FIG. 1B illustrates an increase and a decrease of each lens group at intervals when zooming from the short focal end to the long focal end according to the first embodiment.

FIG. 2A is a cross sectional view illustrating a composition of a zoom lens installed in an image-taking device of the second embodiment.

FIG. 2B illustrates an increase and a decrease of each lens group at intervals when zooming from the short focal end to the long focal end according to the second embodiment.

FIG. 3A is a cross sectional view illustrating a composition of a zoom lens installed in an image-taking device of the third embodiment.

FIG. 3B illustrates an increase and a decrease of each lens group at intervals when zooming from the short focal end to the long focal end according to the third embodiment.

FIG. 4A is a cross sectional view illustrating a composition of a zoom lens installed in an image-taking device of the fourth embodiment.

FIG. 4B illustrates an increase and a decrease of each lens group at intervals when zooming from the short focal end to the long focal end according to the fourth embodiment.

FIGS. 17A and 17B are views illustrating a composition of a camera device in the 5th embodiment, and are external views illustrating the composition as the camera device (or a portable terminal device), in which FIG. 17A illustrates an oblique perspective figure on the front side and FIG. 17B illustrates an oblique perspective figure on the back side.

DETAILED DESCRIPTION OF THE PREFERRED EMBODIMENTS

Figure 1A:
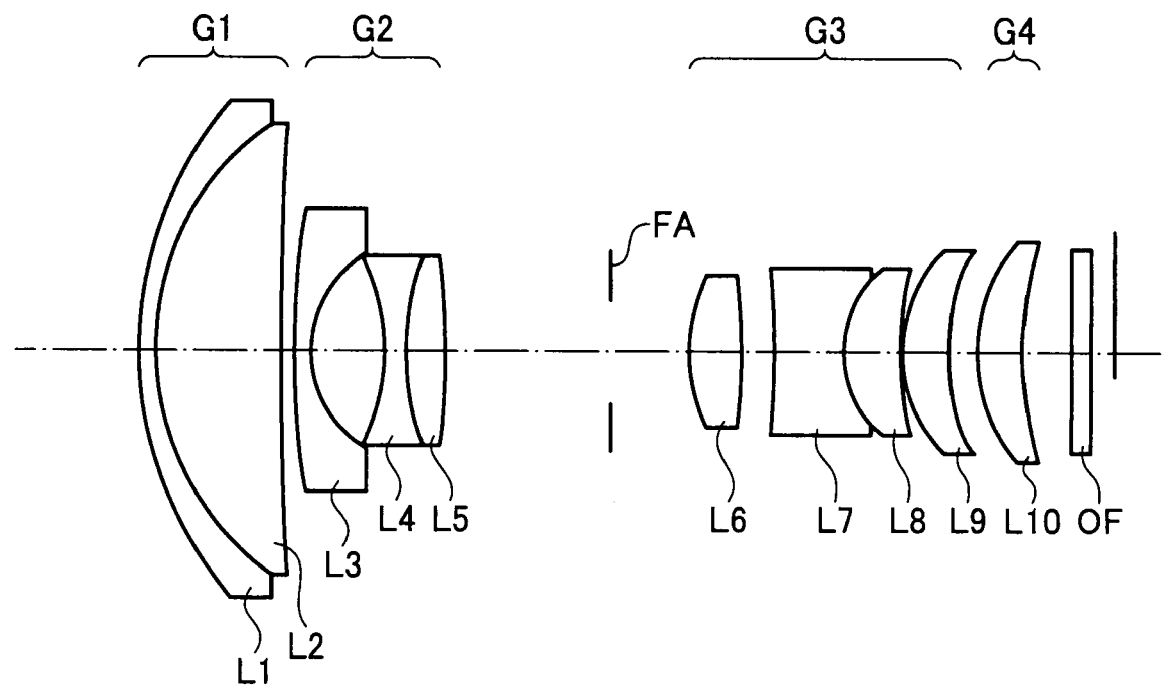
FIGS. 1A and 1B illustrate on a zoom lens according to the first embodiment.

Preferred embodiments of the present invention will be explained in detail with reference to the accompanying drawings below.

An image-taking device according to the present invention is first generally explained. The image-taking device includes from an object side of a zoom lens sequentially: a first lens group G1 with a positive focal length; a second lens group G2 with a negative focal length; a third lens group G3 with a positive focal length; a fourth lens group G4 with a positive focal length. An aperture stop FA is arranged on an object side of the third lens group G3. An optical filter OF is arranged on a rear side of the fourth lens group G4.

In the image-taking device in this embodiment, when zooming from a short focal end to a long focal end, an interval between the first lens group G1 and the second lens group G2 increases, an interval between the second lens group G2 and the third lens group G3 decreases, and an interval between the third lens group G3 and the fourth lens group G4 increases.

In the image-taking device according to the present embodiment, the first lens group G1 has from an object side of the first lens group G1 sequentially: a negative meniscus lens L1 having a convex surface facing the object side of the zoom lens; a positive lens L2. The image-taking device is characterized by satisfying a conditional expression below.

Conditional expression: Nd11>1.96.

(Nd11 is a refractive index of the negative meniscus lens L1.)

Therefore, it is possible for the image-taking device in the present embodiment to correspond to a wide angle of field where a half field angle is 38 degrees or more, and 2.5 or less in F number of the short focal end.

The image-taking device in the present embodiment is characterized by a cemented lens consists of the negative meniscus lens L1 and the positive lens L2. Therefore, it is possible for the image-taking device to be miniaturized and to reduce components of the image-taking device simultaneously.

The image-taking device in the present embodiment is characterized in satisfying a conditional expressions below.

Conditional expression: $1.5 < \beta 3t/\beta 3w < 2.5$ ($\beta 3t$: a transverse magnification of the third lens group G3 in the long focal end. $\beta 3w$: the transverse magnification of the third lens group G3 in the short focal end).

Therefore, even though the image-taking device is small, it is possible to reduce a change in F number from the short focal end to the long focal end.

The image-taking device in the present embodiment is characterized in that the second lens groups G2 has a negative lens L3 most on an object side of the second lens group G2, and satisfies a conditional expression below.

Conditional expression: Nd21>1.75

(Nd21: a refractive index of the negative lens L3)

The image-taking device in the present embodiment is characterized that the second lens group G2 has sequentially from the object side of the second lens group G2: the negative lens L3; a negative lens L4; a positive lens L5. The second lens group G2 satisfies a conditional expression below.

Conditional expression: $-0.75 < (R221-R232)/(R221+R232) < -0.45$ (R221: a curvature radius on an object side of the negative lens L4. R232: the curvature radius on an image side of the positive lens L5).

The image-taking device in the present embodiment is characterized in a cemented lens which consists of the negative lens L4 and the positive lens L5. As a result, it is possible to reduce an influence of an assembly error margin and to achieve a stabilization of a performance The image-taking device in the present embodiment is characterized in satisfying a conditional expression below.

Conditional expression: $6.5 < f1/fw < 9.5$ (f1: a focal length of the first lens group G1. Fw: a focal length on the short focal end.)

Thus, it is possible for the image-taking device to reduce the change in F number from the short focal end to the long focal end and to be miniaturized.

The image-taking device in the present embodiment is characterized in that the first lens group G1 and the third lens group G3 are moved to the object side of the zoom lens at the zooming from the short focal end to the long focal end. Thus, it is possible for the image-taking device to be miniaturized. Hereafter, some embodiments of the above-mentioned image-taking device of the present embodiments will be explained in detail referring to accompanying drawings.

First Embodiment

A first embodiment of an image-taking device according to the present invention will be explained by referring to FIG. 1.

The image-taking device adopts a four lens groups zoom type where each of the four lens groups places a positive lens ahead most to an object side of each of the four lens groups as illustrated in FIG. 1. It is possible to effect an efficient zooming by moving each of lens groups G1-G4 in such a way that an interval between a first lens group G1 and a second lens group G2 increases, an interval between the second lens group G2 and a third lens group G3 decreases, an interval between the third lens group G3 and a fourth lens group G4 increases by zooming from the short focal end to the long focal end.

There are two problems below which to be solved to achieve a wide angle of field where a half field angle is 38 degrees or more, and to achieve 2.5 or less in F number in a short focal end together with miniaturizing the image-taking device by using the four lens groups zoom type described above.

As a first problem, a ray outside an axis through the first lens group G1 passes around a maximum effective diameter in the both short and long focal ends, and the ray angle is different between in the short and long focal ends, thus a correction of an aberration outside the axis between the short and long focal ends becomes a trade-off relation.

As a second problem, since a marginal ray on the axis rises when F number is small, an amount of the aberration generated by a negative meniscus lens L1 grows. It is difficult to miniaturize the image-taking device if the number of lenses of the first lens group G1 is not smaller as much as possible. Therefore, it is necessary to enhance an ability of correcting the aberration of the negative meniscus lens L1.

Considering the first and second problems described above, in the image-taking device of the present embodiment, the first lens group G1 has sequentially from the object side of the first lens group G1: the negative meniscus lens L1 having a convex surface facing an object side of the zoom lens; the positive lens L2. The first lens group G1 is configured to satisfy a conditional expression below.

Nd11>1.96            Conditional expression (1)

(Nd11: a refractive index of the negative meniscus lens L1.)

When exceeding a lower bound value of the conditional expression (1), it is difficult to correct the aberration outside the axis from the short focal end to a long focal end, and to miniaturize the image-taking device, and to achieve the wide angle of field where the half field angle is 38 degrees or more and 2.5 or less in F number in the short focal end. Therefore, it is preferred for the image-taking device to be configured to satisfy the conditional expression (1).

It is more preferred for the image-taking device of the present embodiment to be configured to satisfy a conditional expression (1') below.

Conditional expression (1'): Nd11>1.965

In the image-taking device of the embodiment, it is preferred that the negative meniscus lens L1 and the positive lens L2 are connected. Thus, even though the image-taking device is efficient, it is possible to reduce components to fix the lenses L1, L2 and to reduce a thickness of the first lens group G1.

It is preferable for the image-taking device to satisfy a conditional expression (2) as mentioned below to reduce a change in F number from the short focal end to the long focal end, even though the image-taking device is small.

Conditional expression (2): $1.5 < \beta 3t/\beta 3w < 2.5$ ($\beta$3t: a transverse magnification of the third lens group G3 in the long focal end, $\beta$3w: the transverse magnification of the third lens group G3 in the short focal end.)

When exceeding a lower bound value of conditional expression (2), it leads to that a contribution of the second lens group G2 to the zooming increases, which results in an enlargement of the first lens group G1. Therefore, it is difficult to correct an aberration of the first lens group G1 together with a miniaturization of the image-taking device. Moreover, when the upper bound value of the conditional expression (2) is exceeded, an amount of the change in F number and the change in F number both grow to be large from the short focal end to the long focal end. Therefore, it is preferred for the image-taking device to be configured to satisfy the conditional expression (2).

Moreover, it is preferred that the second lens group G2 has a negative lens L3 most on the object side of the second lens group G2, and satisfies a conditional expression (3) below for the image-taking device of the present embodiment to obtain a higher image formation performance.

Conditional expression (3): Nd21>1.75

(Nd21: a refractive index of the negative lens L3.)

To obtain a wide angel of field, it is necessary to make the ray outside the axis refracted largely in the negative lens L3 of the second lens group G2, that is most on the object side of the second lens group G2. For making the second lens group G2 contributed to the zooming, and to shorten a focal length of the first lens group G1, it is necessary for the negative lens L3 of the second lens group G2 positioning most on the object side of the second lens group G2 to make the ray outside the axis refracted more largely. Therefore, it is necessary to reduce an aberration outside the axis generated by the negative lens L3 of the second lens group G2 positioning most on the object side of the second lens group G2.

When a lower bound value of the conditional expression (3) is exceeded, it is difficult to correct the aberration outside the axis in the short focal end. Therefore, it is preferred for the image-taking device of the present embodiment to be configured to satisfy the conditional expression (3). It is more preferred for the image-taking device of the present embodiment to be configured to satisfy a conditional expression (3') below.

Conditional expression (3'): Nd21>1.80

To obtain a higher image formation performance in the image-taking device of the present embodiment, it is preferred that the second lens group G2 has sequentially from the object side of the second lens group G2: the negative lens L3; the negative lens L4; and the positive lens L5 and it is preferred for the second lens group G2 to be configured to satisfy a conditional expressions (4) below.

Conditional expression (4): $-0.75 < (R221-R232)/(R221+R232) < -0.45$ (R221: a curvature radius on an object side of the negative lens L4. R232: a curvature radius on an image side of the positive lens L5)

The aberration is exchanged between the object side of a negative lens L4 and the image side of a positive lens L5 each other. Therefore, to correct the aberration excellently, it is necessary to take a balance of aberrations caused by these two surfaces.

When an upper or a lower bound value of the conditional expression (4) is exceeded, it is difficult to take the balance of the aberrations caused by the two surfaces. Therefore, it is preferred for the image-taking device to be configured to satisfy the conditional expression (4).

It is possible for the image-taking device of the present embodiment to keep an assembly error margin small by connecting two lenses, the negative lens L4 and the positive lens L5.

It is preferred for the image-taking device of the present embodiment to be configured to satisfy a conditional expressions (5) below to keep the change in F number small from the short focal end to the long focal end and miniaturize the image-taking device.

Conditional expression (5): $6.5 < f1/fw < 9.5$ (F1: a focal length of the first lens group G1. Fw: a focal length on the short focal end.)

If a lower bound value of the conditional expression (5) is exceeded, it is necessary for a lens construction to be complicated to correct an aberration within the first lens group G1, and which results in that the first lens group G1 is thicker. When an upper bound value of the conditional expression (5) is exceeded, a contribution of the third lens group G2 to the zooming decreases so that the contribution of the second lens group G3 to the zooming increases and the change in F number from the short focal end to the long focal end grows. Therefore, it is preferred for the image-taking device to be configured to satisfy the conditional expression (5).

For the image-taking device of the present embodiment to obtain a wide angel of field, it is preferred that the first lens group G1 and the third lens group G3 move to the object side of the zoom lens by zooming from the short focal end to the long focal end.

By a movement of the first lens group G1 to the object side of the zoom lens, in the short focal end, since it is possible for the first lens group G1 to be arranged near a aperture stop FA, which is advantageous for the miniaturization of the image-taking device and together with obtaining the wide angel of field. In the long focal end, because of a total length of the lens is long, which is advantageous for an entire aberration correction.

By a movement of the third lens group G3 to the object side of the zoom lens, which leads the third lens group G3 to have a contribution to the zooming, and it is possible for the second lens group G2 to reduce the contribution of the second lens group G2 to the zooming. Therefore, it is possible to reduce an amount of a movement of the second lens group G2. Since it is possible for the first lens group G1 to be arranged near the aperture stop FA, which is advantageous for the miniaturization of the image-taking device. Therefore, at the zooming from the short focal end to the long focal end, it is preferred for the first lens group G1 and the third lens group G3 to be configured to move to the object side of the zoom lens. (Embodiment in an image-taking device of the present embodiment)

Next, one embodiment of the present embodiment described above will be explained hereinafter.

It is possible for the image-taking device to obtain the wide angle of field where the half field angle is 38 degrees or more, 2.5 or less in F number in the short focal end, and keep an excellent image formation performance by configuring a zoom lens as the image-taking device of the present embodiment. Meanings of the signs in a first embodiment to a fourth embodiment will be explained as follows.

f: Focal length of all system;
F: F number;
ω: Half field angle;
R: Curvature radius;
D: Surface separation;
Nd: Refractive index;
νd: Abbe number;
k: Asphere conic constant;
A4: 4 th asphere coefficient;
A6: 6 th asphere coefficient;
A8: 8 th asphere coefficient;
A10: 10 th asphere coefficient;
A12: 12 th asphere coefficient;
A14: 14 th asphere coefficient;
A16: 16 th asphere coefficient;
A18: 18 th asphere coefficient When a reciprocal of a paraxial curvature radius (a paraxial curvature) is assumed to be C and a height from a optical axis is assumed to be H, an asphere used by the first to fourth embodiment is defined by a expressions 1 as follows.)

$$x = \frac{CH^2}{1+\sqrt{(1-(1+K)C^2H^2)}} + A4 \cdot H^4 + A6 \cdot H^6 + A8 \cdot H^8 + A10 \cdot H^{10} + A12 \cdot H^{12} + A14 \cdot H^{14} + A16 \cdot H^{16} + A18 \cdot H^{18}$$

Formula 1

First, a zoom lens installed in an image-taking device of the first embodiment will be explained by referring to FIG. 1.

Figure 1B:

As illustrated in FIG. 1A, the zoom lens of the first embodiment includes from an object side of the zoom lens sequentially: a first lens group G1 with a positive focal length; a second lens group G2 with a negative focal length; a third lens group G3 with a positive focal length; a fourth lens group G4 with a positive focal length. An aperture stop FA is arranged at an object side of the third lens group G3. A filter OF is arranged behind the fourth lens group G4. As illustrated in FIG. 1B, by zooming from a short focal end to a long focal end, an interval between the first lens group G1 and the second lens group G2 increases, an interval between the second lens group G2 and the third lens group G3 decreases, an interval between the third lens group G3 and the fourth lens group G4 increases.

The first lens group G1 includes a first lens L1 and a second lens L2. The second lens group G2 includes a third lens L3, a fourth lens L4, and a fifth lens L5. The third lens group includes a sixth lens L6, a seventh lens L7, an eighth lens L8, and a ninth lens L9. The fourth lens group G4 includes a tenth lens L10.

In the first embodiment, f is a focal length of all systems, F is F number. ω is a half field angle which changes by a zoom within a range where f=5.91-17.69, F=2.37-3.40, and ω=39.25-14.76, respectively.

An optical characteristic that relates to an optical surface and an optical element is shown in the following Table 1, respectively. R is a curvature radius, D is a surface separation, Nd is a refractive index, and νd is an Abbe number.

The optical characteristic

TABLE 1

|   | R | D | $N_d$ | $v_d$ |   |
|---|---|---|---|---|---|
| 1 | 18.757 | 0.85 | 2.00069 | 25.46 | 1st lens |
| 2 | 13.628 | 6.31 | 1.61772 | 49.81 | 2nd lens |

TABLE 1-continued

|   | R | D | $N_d$ | $v_d$ |   |
|---|---|---|---|---|---|
| 3 | 171.536 | Variable (A) |   |   |   |
| 4(Asphere) | 82.409 | 0.85 | 1.80610 | 40.88 | 3rd lens |
| 5 | 5.618 | 3.76 |   |   |   |
| 6 | −10.022 | 1.10 | 1.48749 | 70.24 | 4th lens |
| 7 | 14.205 | 1.97 | 1.90366 | 31.32 | 5th lens |
| 8 | −35.386 | Variable (B) |   |   |   |
| 9 | Aperture stop | Variable (C) |   |   |   |
| 10(Asphere) | 8.016 | 2.67 | 1.67790 | 54.89 | 6th lens |
| 11 | −24.694 | 1.68 |   |   |   |
| 12 | −42.555 | 3.50 | 1.78470 | 26.29 | 7th lens |
| 13 | 5.455 | 2.88 | 1.48749 | 70.24 | 8th lens |
| 14 | 17.119 | 0.10 |   |   |   |
| 15 | 7.212 | 2.39 | 1.69350 | 53.18 | 9th lens |
| 16(Asphere) | 21.726 | Variable (D) |   |   |   |
| 17(Asphere) | 8.311 | 2.26 | 1.58913 | 61.15 | 10th lens |
| 18 | 18.000 | Variable (E) |   |   |   |
| 19 | 0.000 | 0.90 | 1.52174 | 64.00 | various filter |
| 20 | 0.000 | — |   |   |   |

The 4th, 10th, 16th, and 17th optical surfaces are aspheres and which are described as "Asphere" in the Table 1. Parameters in the conditional expression (1) described above for each of the aspheres are as follows.

Asphere: 4th surface
k=0.0
A4=1.80642E-04
A6=3.72113E-06
A8=−4.97509E-07
A10=2.05709E-08
A12=−3.69554E-10
A14=9.89887E-13
A16=5.28433E-14
A18=−5.01612E-16
Asphere: 10th surface
K=0.0
A4=−2.24833E-04
A6=1.16666E-06
A8=−3.82330E-07
A10=1.32971E-08
Asphere: 16th surface
K=0.0
A4=7.59600E-04
A6=8.10211E-06
A8=1.52863E-07
A10=−3.22969E-09
Asphere: 17th surface
K=0.0
A4=−8.88350E-05
A6=3.52460E-06
A8=−1.13134E-07
A10=2.07200E-09

In the surface separation D of the Table 1, "variable (A)-variable (E)" changes in the D along with the zoom as shown in the following Table 2.

Variable Interval

TABLE 2

|   | Wide<br>f = 5.91 | Mean<br>f = 10.22 | Tele<br>f = 17.69 |
|---|---|---|---|
| A | 0.7184 | 5.5071 | 11.4480 |
| B | 8.4557 | 4.9076 | 0.1000 |
| C | 3.9902 | 1.0757 | 1.7000 |
| D | 1.4000 | 4.6103 | 7.8611 |
| E | 2.4775 | 2.4539 | 2.4014 |

Numerical values according to each of the conditional expressions in the first embodiment described above are as follows and each of the values is within a range of each of the conditional expressions or close to the range.

[Numerical values in conditional expressions]

$Nd11 = 2.00069$ $\beta 3t/\beta 3w = 1.89$ $Nd21 = 1.80610$ $(R221 - R232)/(R221 + R232) = -0.56$ $f1/fw = 7.45$

Second Embodiment

Next, a zoom lens installed in an image-taking device of the second embodiment will be explained by referring to FIG. 2.

Figure 2A:
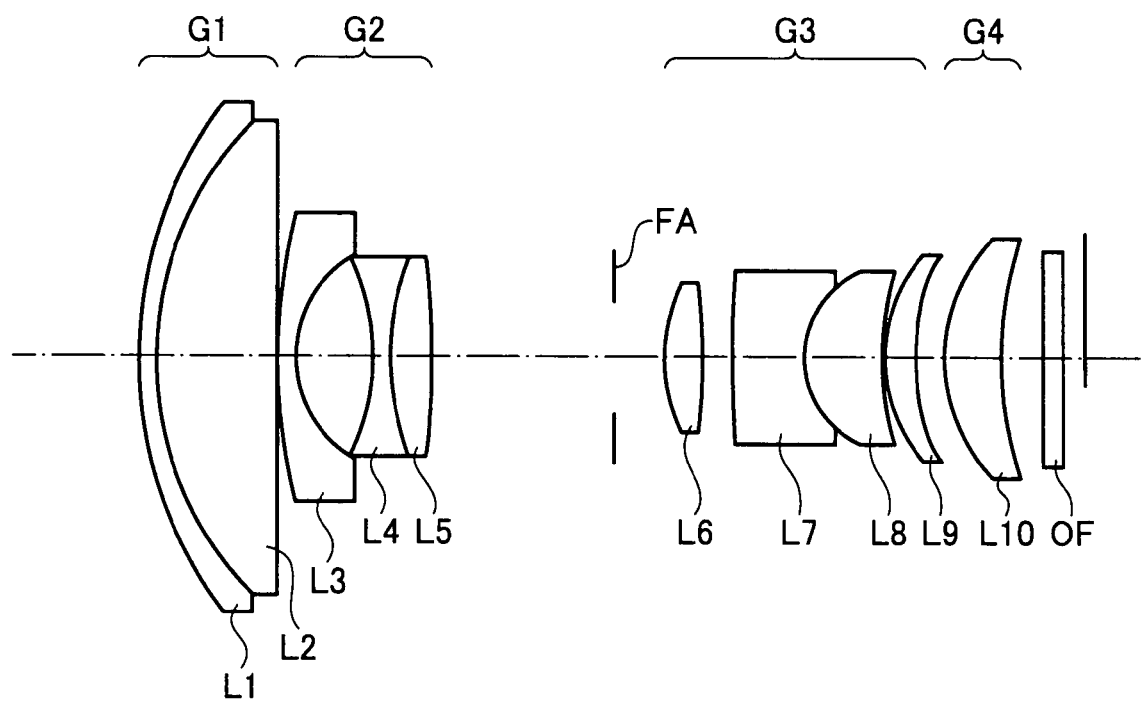
FIGS. 2A and 2B illustrate on a zoom lens according to the second embodiment.
Figure 2B:
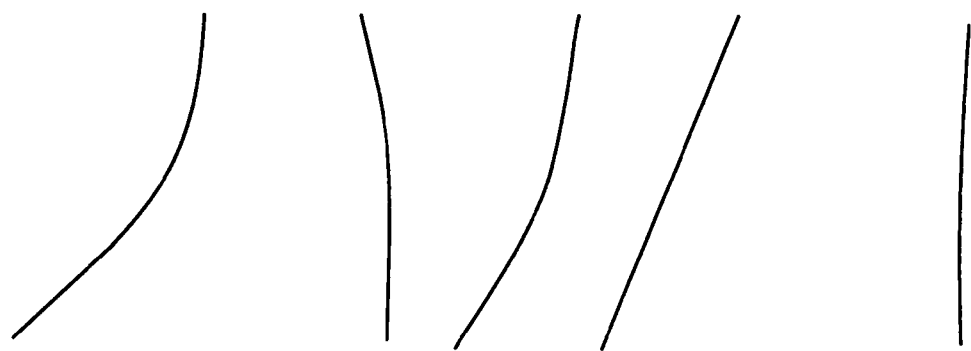

As well as the zoom lens of the first embodiment, the zoom lens of the second embodiment includes from an object side of the zoom lens sequentially as illustrated in FIG. 2A: a first lens group G1 with a positive focal length; a second lens group G2 with a negative focal length; an aperture stop FA which is arranged in an object side of a third lens group G3; the third lens group G3 with a positive focal length; a fourth lens group G4 with a positive focal length; a optical filter OF behind the fourth lens group G4. As illustrated in FIG. 2B, by zooming from a short focal end to a long focal end, an interval between the first lens group G1 and the second lens group G2 increases, an interval between the second lens group G2 and the third lens group G3 decreases, an interval between the third lens group G3 and the fourth lens group G4 increases.

The first lens group G1 composes a first lens L1 and a second lens L2. The second lens group G2 includes a third lens L3 and a fourth lens L4 and a fifth lens L5. The third lens group G3 includes a sixth lens L6, a seventh lens L7, an eighth lens L8 and a ninth lens L9. The fourth lens group G4 includes a tenth lens L10.

In the second embodiment, f is a focal length of all systems, F is F number, ω is a half field angle which changes respectively by zooming within a range where f=5.89-17.68, F=2.40-3.43, and ω=39.30-14.53. An optical characteristic that relates to an optical surface and an optical element are as in the following Table 3. R is a curvature radius. D is a surface separation. Nd is a refractive index and vd is Abbe number.

Optical Characteristic

TABLE 3

|   | R | D | $N_d$ | $v_d$ |   |
|---|---|---|---|---|---|
| 1 | 20.080 | 0.85 | 2.00330 | 28.27 | 1st lens |
| 2 | 15.958 | 5.90 | 1.51633 | 64.14 | 2nd lens |
| 3 | 8204.218 | Variable (A) |   |   |   |
| 4(Asphere) | 54.254 | 0.85 | 1.80610 | 40.88 | 3rd lens |
| 5(Asphere) | 5.523 | 3.79 |   |   |   |
| 6 | −10.349 | 0.85 | 1.48749 | 70.24 | 4th lens |
| 7 | 12.730 | 2.05 | 1.90366 | 31.32 | 5th lens |
| 8 | −40.728 | Variable (B) |   |   |   |
| 9 | Aperture stop | Variable (C) |   |   |   |
| 10(Asphere) | 7.564 | 1.88 | 1.67790 | 54.89 | 6th lens |
| 11 | −30.925 | 1.47 |   |   |   |
| 12 | 79.354 | 3.50 | 1.78470 | 26.29 | 7th lens |
| 13 | 4.385 | 3.83 | 1.48749 | 70.24 | 8th lens |
| 14 | 13.266 | 0.14 |   |   |   |
| 15 | 7.240 | 1.53 | 1.69350 | 53.18 | 9th lens |
| 16(Asphere) | 14.300 | Variable (D) |   |   |   |
| 17(Asphere) | 7.731 | 2.81 | 1.58913 | 61.15 | 10th lens |
| 18 | 18.000 | Variable (E) |   |   |   |
| 19 | 0.000 | 0.90 | 1.52174 | 64.00 | various filter |
| 20 | 0.000 |   |   |   |   |

In the Table 3, the 4th, 5th, 10th, 16th, and 17th optical surfaces described as "Asphere" are aspheres respectively. Parameters according to the conditional expression (1) in each asphere described above are as follows.

Asphere: 4th surface
K=0.0
A4=2.34367E-04
A6=3.32703E-06
A8=−5.11387E-07
A10=2.05404E-08
A12=−3.65670E-10
A14=1.03287E-12
A16=5.21445E-14
A18=−5.07361E-16

Asphere: 5th surface
K=0.0
A4=−2.31111E-06
A6=1.41558E-05
A8=−6.29891E-07
A10=7.78169E-09

Asphere: 10th surface
K=0.0
A4=−2.86019E-04
A6=−2.27803E-06
A8=4.62512E-08
A10=−8.38162E-09

Asphere: 16th surface
K=0.0
A4=6.16974E-04
A6=2.53643E-06
A8=1.11135E-07
A10=−3.61768E-09

Asphere: 17th surface
K=0.0,
A4=−1.26877E-04,
A6=1.82080E-06,
A8=−6.30930E-08,

A10=6.73232E-10

In a surface separation (D) in the Table 3, "Variable (A)–Variable (E)" changes along with the zooming as shown in the following Table 4.

Variable Interval

TABLE 4

|   | Wide<br>f = 5.89 | Mean<br>f = 10.21 | Tele<br>f = 17.68 |
|---|---|---|---|
| A | 0.1000 | 5.7957 | 12.3678 |
| B | 8.9905 | 5.0598 | 0.1000 |
| C | 2.5134 | 0.4211 | 1.7000 |
| D | 1.4000 | 4.2422 | 8.2873 |
| E | 2.0769 | 2.5194 | 2.5233 |

Numerical values according to each of the conditional expressions in the second embodiment described above are as follows and each value is within a range of each of the conditional expressions and close to the range.

[Numerical values in conditional expressions]

Nd11=2.00330

$$\beta 3t/\beta 3w=2.04$$

Nd21=1.80610

$$(R221-R232)/(R221+R232)=-0.59$$

$$f1/fw=8.47$$

Third Embodiment

Next, a zoom lens installed in an image-taking device of the third embodiment will be explained by referring to FIG. 3.

Figure 3A:
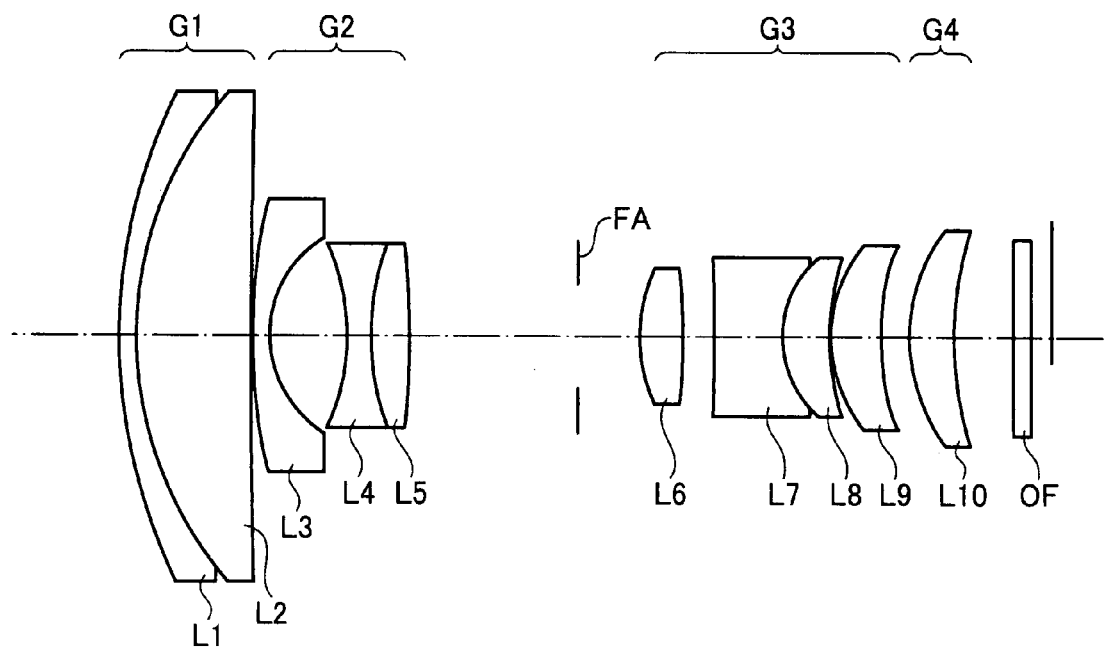
FIGS. 3A and 3B illustrate on a zoom lens according to the third embodiment.
Figure 3B:
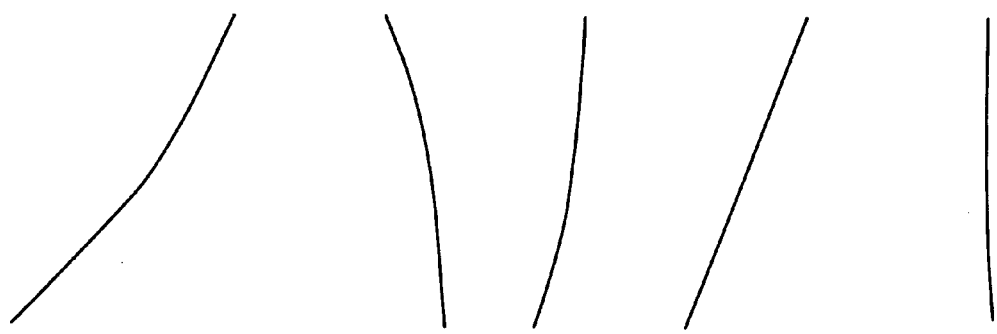

As well as the zoom lens of the first embodiment, the zoom lens of the third embodiment includes sequentially from an object side of the zoom lens as illustrated in FIG. 3A: a first lens group G1 with a positive focal length; a second lens group G2 with a negative focal length; an aperture stop FA arranged on the object side of a third lens group G3; the third lens group G3 with a positive focal length; a fourth lens group G4 with a positive focal length; a optical filter OF behind the fourth lens group G4. As illustrated in FIG. 3B, by zooming from a short focal end to a long focal end, an interval between the first lens group G1 and the second lens group G2 increases, an interval between the second lens group G2 and the third lens group G3 decreases, an interval between the third lens group G3 and the fourth lens group G4 increases.

The first lens group G1 includes a first lens L1 and a second lens L2. The second lens group G2 includes a third lens L3, a fourth lens L4, and a fifth lens L5. The third lens group G3 includes a sixth lens L6, a seventh lens L7, a eighth lens L8, and a ninth lens L9. The fourth lens group G4 includes a tenth lens L10.

In the third embodiment, f is a focal length of all systems, F is F number, ω is a half field angle which changes respectively by zooming within a range where f=5.90-17.71, F=2.40-3.68, and ω=39.41-14.39. An optical characteristic that relates to an optical surface and an optical element respectively are shown in the following Table 5. R is a curvature radius. D is a surface separation. Nd is a refractive index. vd is an Abbe number.

Optical Characteristic

TABLE 5

|   | R | D | $N_d$ | $\nu_d$ |   |
|---|---|---|---|---|---|
| 1 | 25.598 | 0.85 | 1.97000 | 21.50 | 1st lens |
| 2 | 17.231 | 6.12 | 1.70154 | 41.24 | 2nd lens |
| 3 | 374.476 | Variable (A) |   |   |   |
| 4(Asphere) | 39.190 | 0.85 | 1.88300 | 40.76 | 3rd lens |
| 5 | 5.758 | 4.10 |   |   |   |
| 6 | −10.054 | 0.85 | 1.48749 | 70.24 | 4th lens |
| 7 | 14.036 | 1.98 | 1.90366 | 31.32 | 5th lens |
| 8 | −35.416 | Variable (B) |   |   |   |
| 9 | Aperture stop | Variable (C) |   |   |   |
| 10(Asphere) | 7.787 | 1.96 | 1.67790 | 54.89 | 6th lens |
| 11 | −30.041 | 1.75 |   |   |   |
| 12 | −58.546 | 3.41 | 1.78470 | 26.29 | 7th lens |
| 13 | 5.366 | 2.44 | 1.48749 | 70.24 | 8th lens |
| 14 | 12.212 | 0.10 |   |   |   |
| 15 | 7.339 | 2.65 | 1.69350 | 53.18 | 9th lens |
| 16(Asphere) | 31.606 | Variable (D) |   |   |   |
| 17(Asphere) | 8.520 | 2.35 | 1.58913 | 61.15 | 10th lens |
| 18 | 18.000 | Variable (E) |   |   |   |
| 19 | 0.000 | 0.90 | 1.52174 | 64.00 | various filter |
| 20 | 0.000 |   |   |   |   |

In the Table 5, the 4th, 10th, 16th, and 17th optical surfaces described as "Asphere" are aspheres respectively. Parameters according to the conditional expression (1) in each asphere described above are as follows.

Asphere: 4th surface
K=0.0
A4=1.33870E-04
A6=3.72868E-06
A8=−4.84485E-07
A10=2.03497E-08
A12=−3.70058E-10
A14=1.00784E-12
A16=5.26114E-14
A18=−4.96328E-16

Asphere: 10th surface
K=0.0
A4=−2.24833E-04
A6=1.16666E-06
A8=−3.82330E-07
A10=1.32971E-08

Asphere: 16th surface
K=0.0
A4=7.64150E-04
A6=9.12558E-06
A8=3.12834E-07
A10=−7.69883E-09

Asphere: 17th surface
K=0.0
A4=−7.81128E-05
A6=1.87800E-06
A8=−4.74014E-08
A10=6.98221E-10

In the surface separation (D) of the Table 5 above, "Variable (A)–Variable (E)" changes along with the zooming as shown in the following Table 6.

Variable Interval

TABLE 6

|   | Wide f = 5.90 | Mean f = 10.22 | Tele f = 17.69 |
|---|---|---|---|
| A | 0.1000 | 6.7012 | 13.4861 |
| B | 8.7287 | 5.0511 | 1.7000 |
| C | 3.1858 | 0.8788 | 0.1000 |
| D | 1.4000 | 4.5365 | 8.2158 |
| E | 3.0417 | 3.0390 | 3.0020 |

Numerical values according to each of the conditional expressions in the third embodiment described above are as follows and each of the values is within a range of each of the conditional expressions or close to the range.

[Numerical values in conditional expressions]

$Nd11=1.97000$ $\beta 3t/\beta 3w=1.92$ $Nd21=1.80610$ $(R221-R232)/(R221+R232)=-0.66$ $f1/fw=8.63$ Fourth Embodiment Next, a zoom lens installed in an image-taking device of the fourth embodiment will be explained by referring to FIG. 4.

Figure 4A:
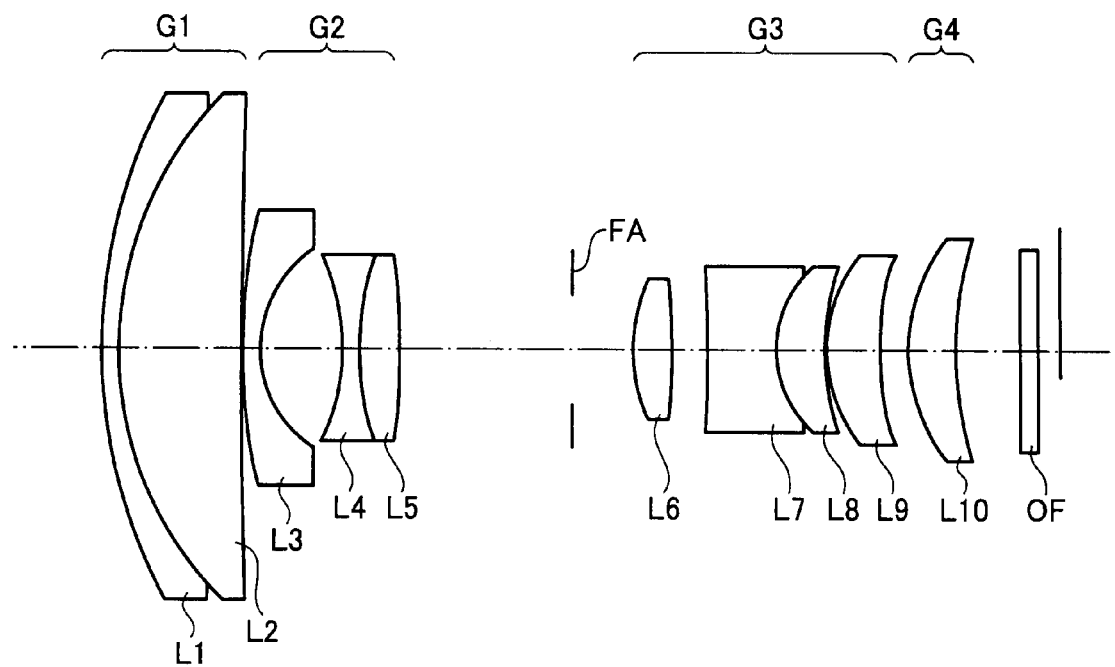
FIGS. 4A and 4B illustrate on a zoom lens according to the fourth embodiment.
Figure 4B:
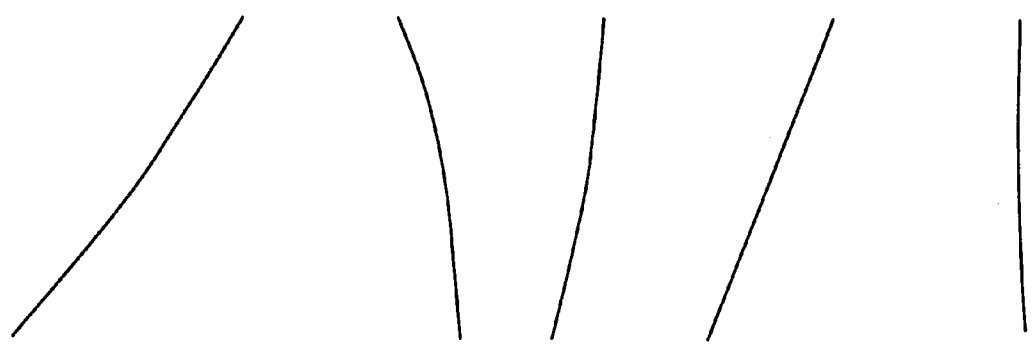

As well as the zoom lens of the first embodiment, the zoom lens of the fourth embodiment includes sequentially from an object side of the zoom lens as illustrated in FIG. 4A: a first lens group G1 with a positive focal length; a second lens group G2 with a negative focal length; an aperture stop FA arranged on the object side of a third lens group G3; the third lens group G3 with a positive focal length; a fourth lens group G4 with a positive focal length; an optical filter OF behind the fourth lens group G4. As illustrated in FIG. 4B, by zooming from a short focal end to a long focal end, an interval between the first lens group G1 and the second lens group G2 increases, an interval between the second lens group G2 and the third lens group G3 decreases, an interval between the third lens group G3 and the fourth lens group G4 increases.

The first lens group G1 includes a first lens L1 and a second lens L2. The second lens group G2 includes a third lens L3, a fourth lens L4, and a fifth lens L5. The third lens group G3 includes a sixth lens L6, a seventh lens L7, an eighth lens L8, and a ninth lens L9. The fourth lens group G4 includes a tenth lens L10.

In the fourth embodiment, f is a focal length of all systems, F is F number, ω is a half field angle which changes respectively by a zooming within a range where f=5.90-17.69, F=2.40-3.61, and ω=39.33-14.40. An optical characteristic that relates to an optical surface and an optical element respectively are shown in the following Table 7. R is a curvature radius. D is a surface separation. Nd is a refractive index. νd is an Abbe number.

Optical Characteristic

TABLE 7

|   | R | D | $N_d$ | $\nu_d$ |   |
|---|---|---|---|---|---|
| 1 | 27.456 | 0.85 | 1.97000 | 21.50 | 1st lens |
| 2 | 18.320 | 5.91 | 1.70154 | 41.24 | 2nd lens |
| 3 | 508.238 | Variable (A) |   |   |   |
| 4(Asphere) | 39.728 | 0.85 | 1.88300 | 40.76 | 3rd lens |
| 5 | 5.662 | 4.01 |   |   |   |
| 6 | −10.729 | 1.20 | 1.48749 | 70.24 | 4th lens |
| 7 | 13.086 | 1.95 | 1.90366 | 31.32 | 5th lens |
| 8 | −52.620 | Variable (B) |   |   |   |
| 9 | Aperture stop | Variable (C) |   |   |   |
| 10(Asphere) | 7.899 | 2.24 | 1.67790 | 54.89 | 6th lens |
| 11 | −30.888 | 1.56 |   |   |   |
| 12 | −137.290 | 3.50 | 1.78470 | 26.29 | 7th lens |
| 13 | 5.179 | 2.44 | 1.48749 | 70.24 | 8th lens |
| 14 | 11.962 | 0.10 |   |   |   |
| 15 | 7.230 | 2.59 | 1.69350 | 53.18 | 9th lens |
| 16(Asphere) | 25.638 | Variable (D) |   |   |   |
| 17(Asphere) | 8.595 | 2.32 | 1.58913 | 61.15 | 10th lens |
| 18 | 18.000 | Variable (E) |   |   |   |
| 19 | 0.000 | 0.90 | 1.52174 | 64.00 | various filter |
| 20 | 0.000 |   |   |   |   |

In the Table 7, the 4th, 10th, 16th, and 17th optical surfaces described as "Asphere" are aspheres respectively. Parameters according to the conditional expression (1) described above in each asphere are as follows.

Asphere: 4th surface
K=0.0
A4=1.45306E-04
A6=3.28896E-06
A8=−4.75665E-07
A10=2.03567E-08
A12=−3.71070E-10
A14=9.80637E-13
A16=5.25665E-14
A18=−4.86934E-16

Asphere: 10th surface
K=0.0
A4=−2.24833E-04
A6=1.16666E-06
A8=−3.82330E-07
A10=1.32971E-08

Asphere: 16th surface
K=0.0
A4=7.63329E-04
A6=7.69796E-06
A8=3.87705E-07
A10=−9.61147E-09

Asphere: 17th surface
K=0.0
A4=−8.35213E-05
A6=2.80926E-06
A8=−6.63066E-08
A10=9.32270E-10

In the surface separation (D) in the Table 7, "Variable (A)–variable (E)" changes along with the zooming as shown in the following Table 8.

Variable Intervals

TABLE 8

|   | Wide<br>f = 5.90 | Mean<br>f = 10.22 | Tele<br>f = 17.69 |
|---|---|---|---|
| A | 0.1000 | 6.4875 | 12.9217 |
| B | 8.7152 | 4.6179 | 1.7000 |
| C | 2.9971 | 1.2793 | 0.1000 |
| D | 1.4000 | 4.5442 | 8.1697 |
| E | 3.1909 | 3.1820 | 3.1440 |

Numerical values according to each of the conditional expressions in the fourth embodiment described above are as follows and each of the values is within a range of each of the conditional expressions or close to the range.

[Numerical values in conditional expressions]

Figure 5:
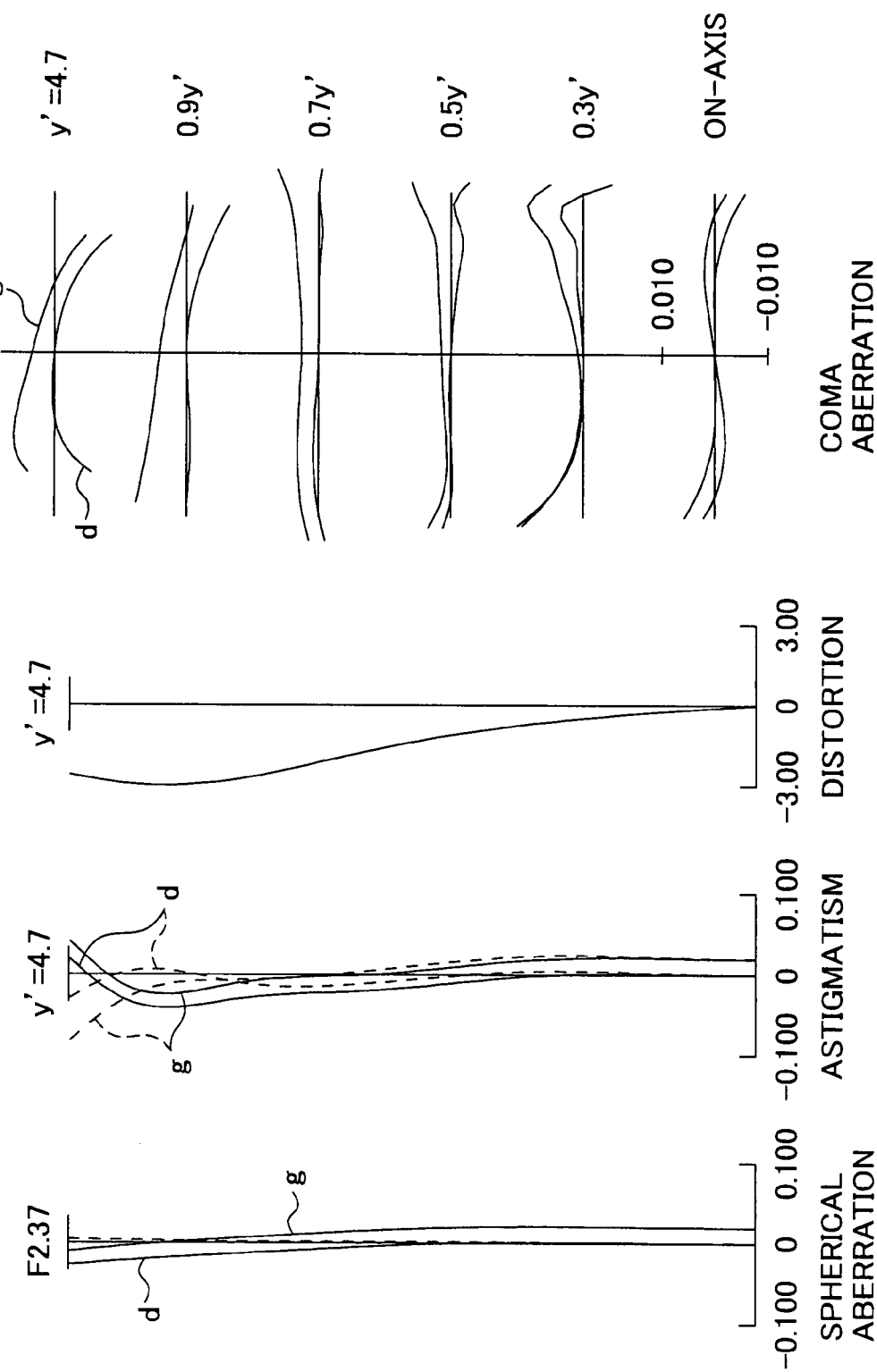
FIG. 5 is an aberration curve chart in a short focal end of the zoom lens installed in the image-taking device of the first embodiment.
Figure 6:
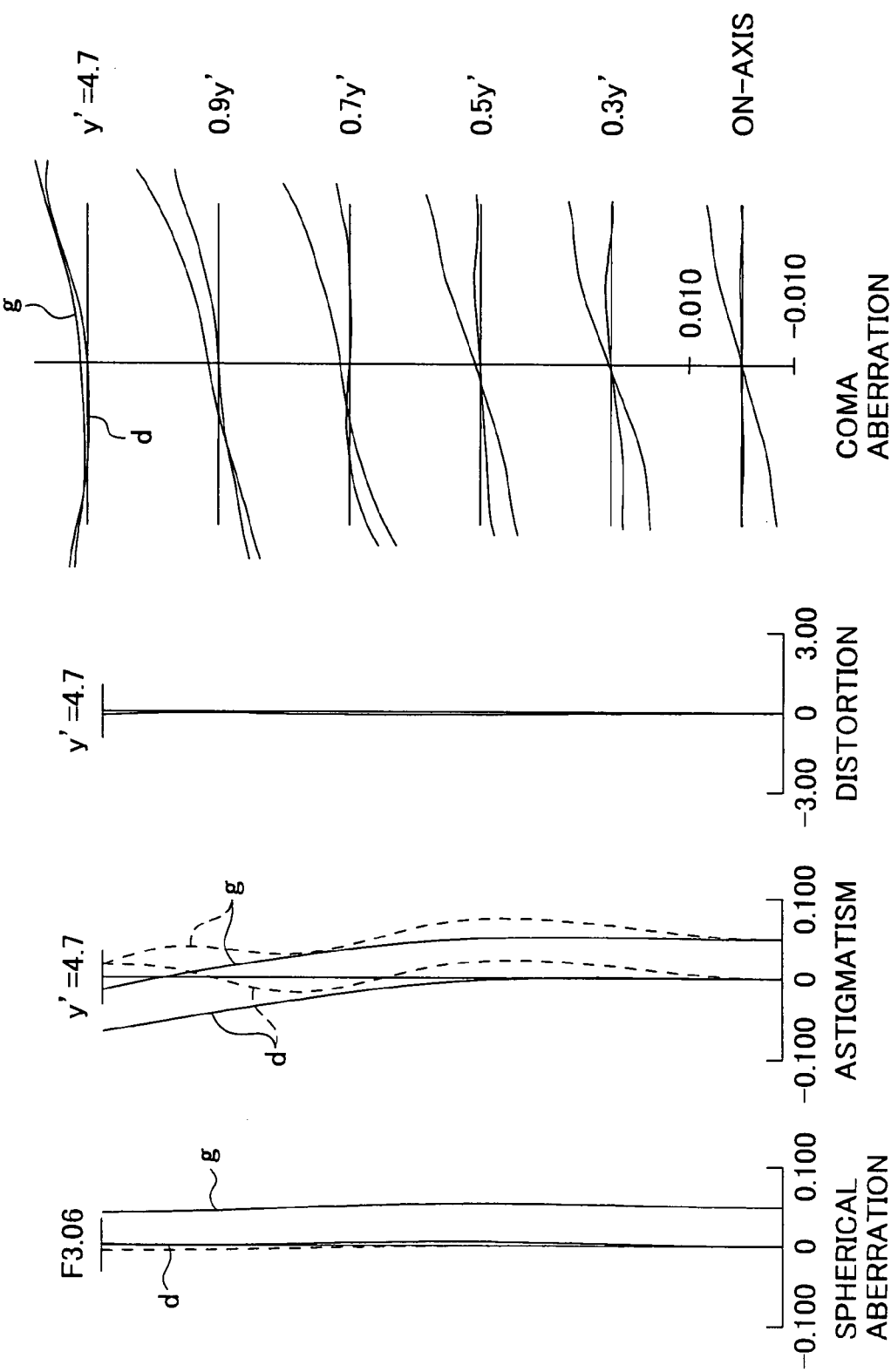
FIG. 6 is an aberration curve chart in a middle focal length of the zoom lens installed in the image-taking device of the first embodiment.
Figure 7:
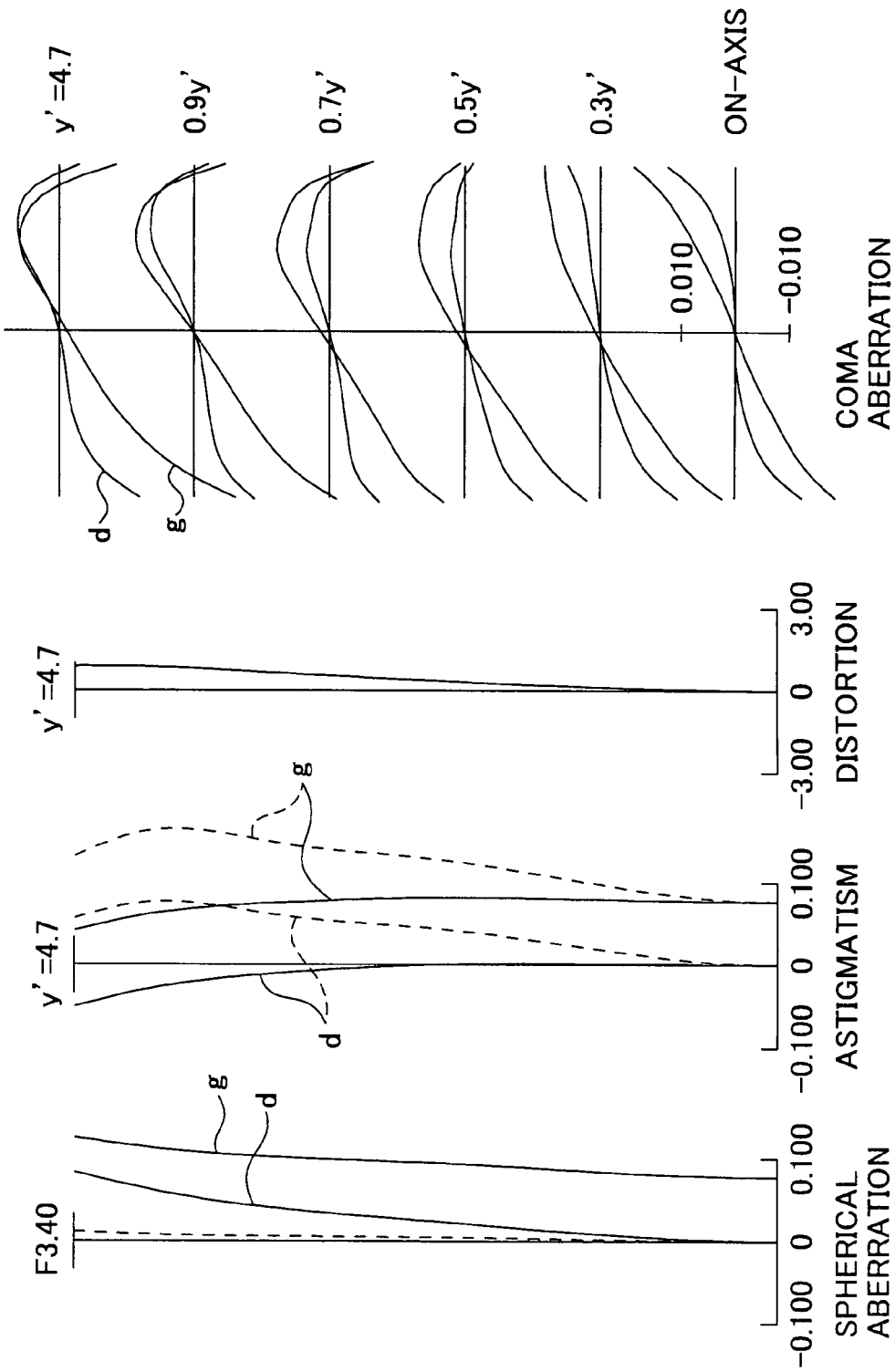
FIG. 7 is an aberration curve chart in a long focal end of the zoom lens installed in the image-taking device of the first embodiment.

$Nd11 = 1.97000$ $\beta 3t/\beta 3w = 1.87$ $Nd21 = 1.88300$ $(R221 - R232)/(R221 + R232) = -0.56$ $f1/fw = 8.12$ FIG. 5 illustrates an aberration curve chart in the short focal end of the zoom lens of the first embodiment. FIG. 6 illustrates an aberration curve chart in the middle focal length of the zoom lens of the first embodiment. FIG. 7 illustrates an aberration curve chart in the long focal end of the zoom lens of the first embodiment.

Figure 8:
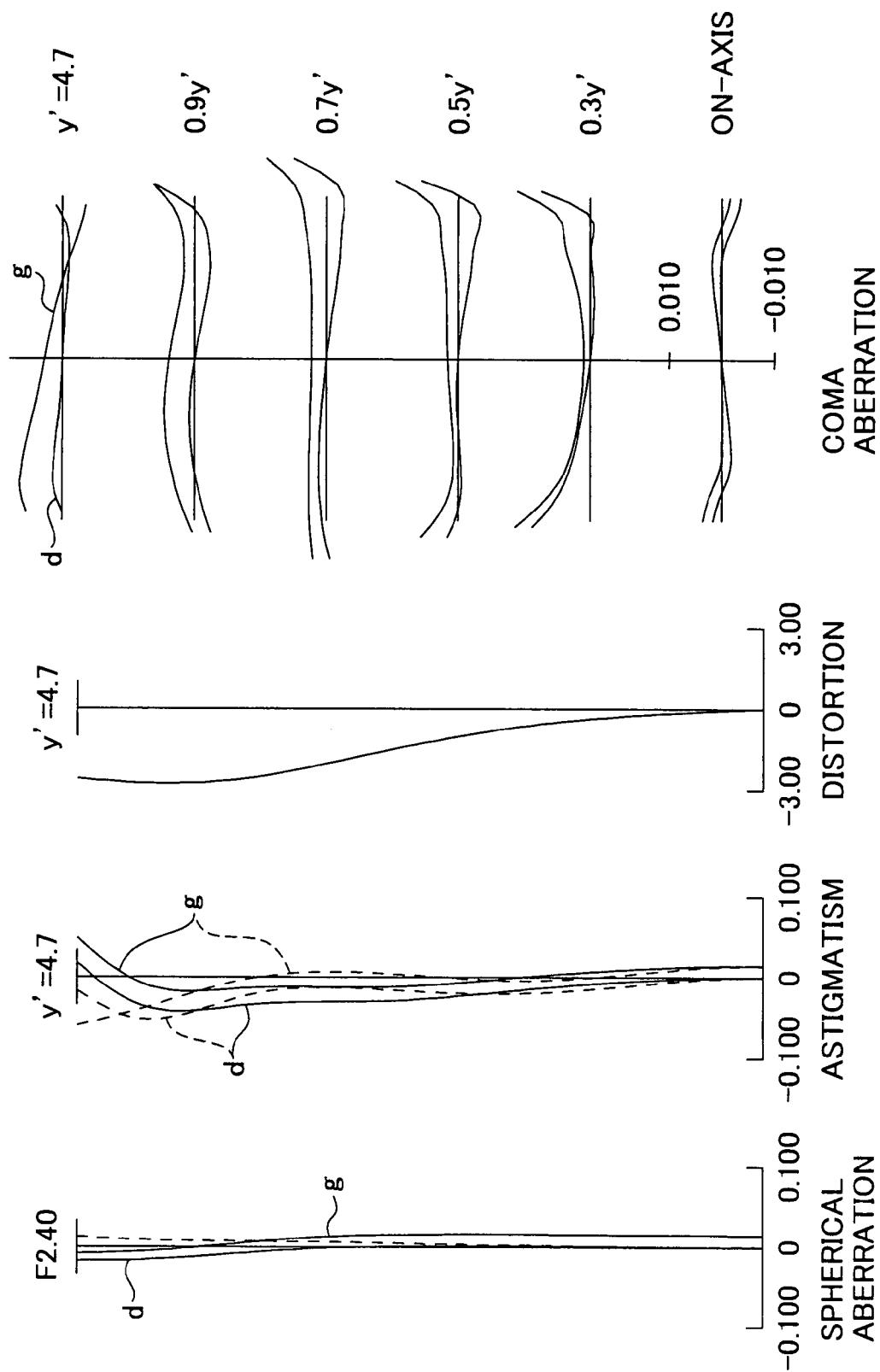
FIG. 8 is an aberration curve chart in a short focal end of the zoom lens installed in the image-taking device of the second embodiment.
Figure 9:
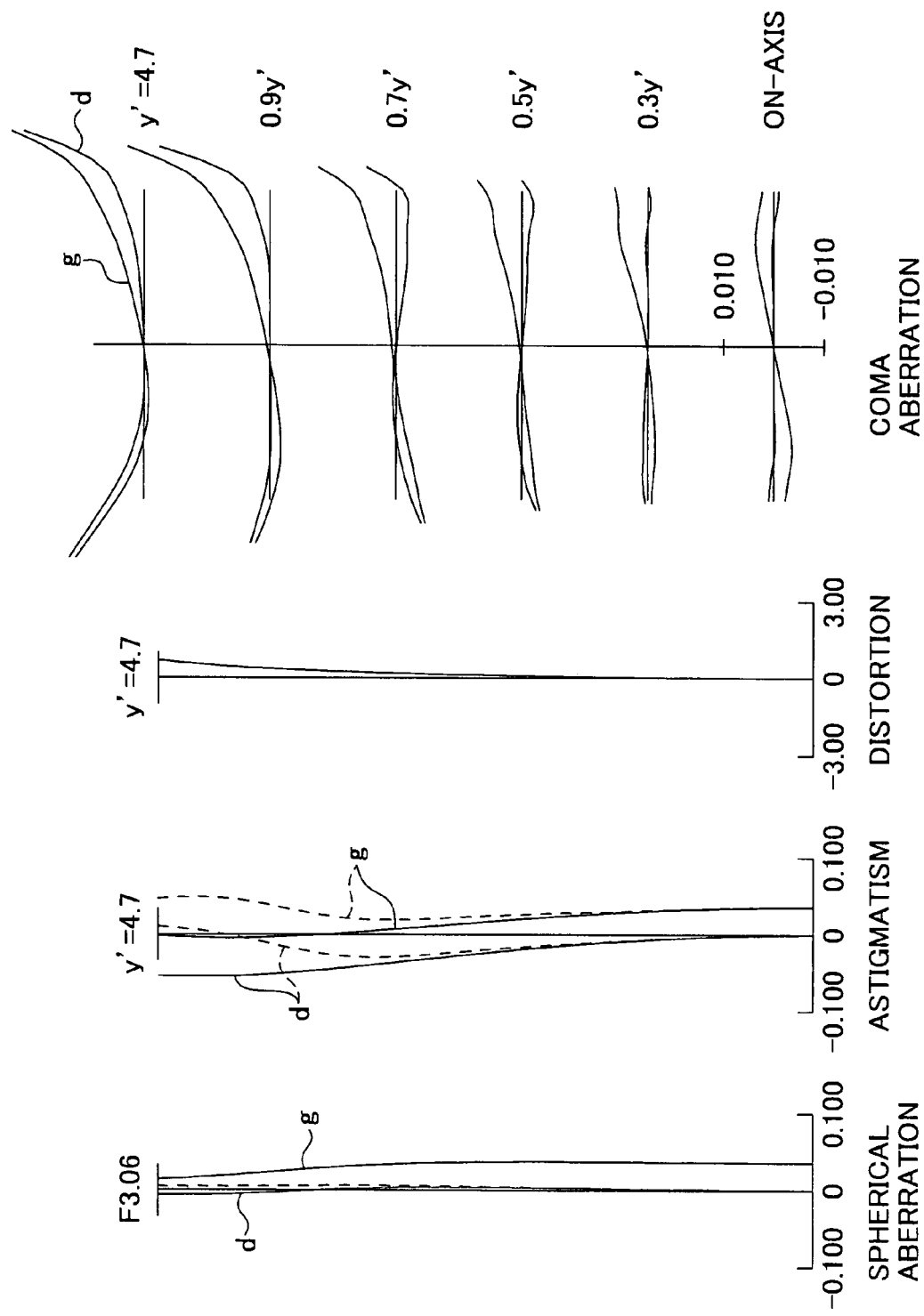
FIG. 9 is an aberration curve chart in a middle focal length of the zoom lens installed in the image-taking device of the second embodiment.
Figure 10:
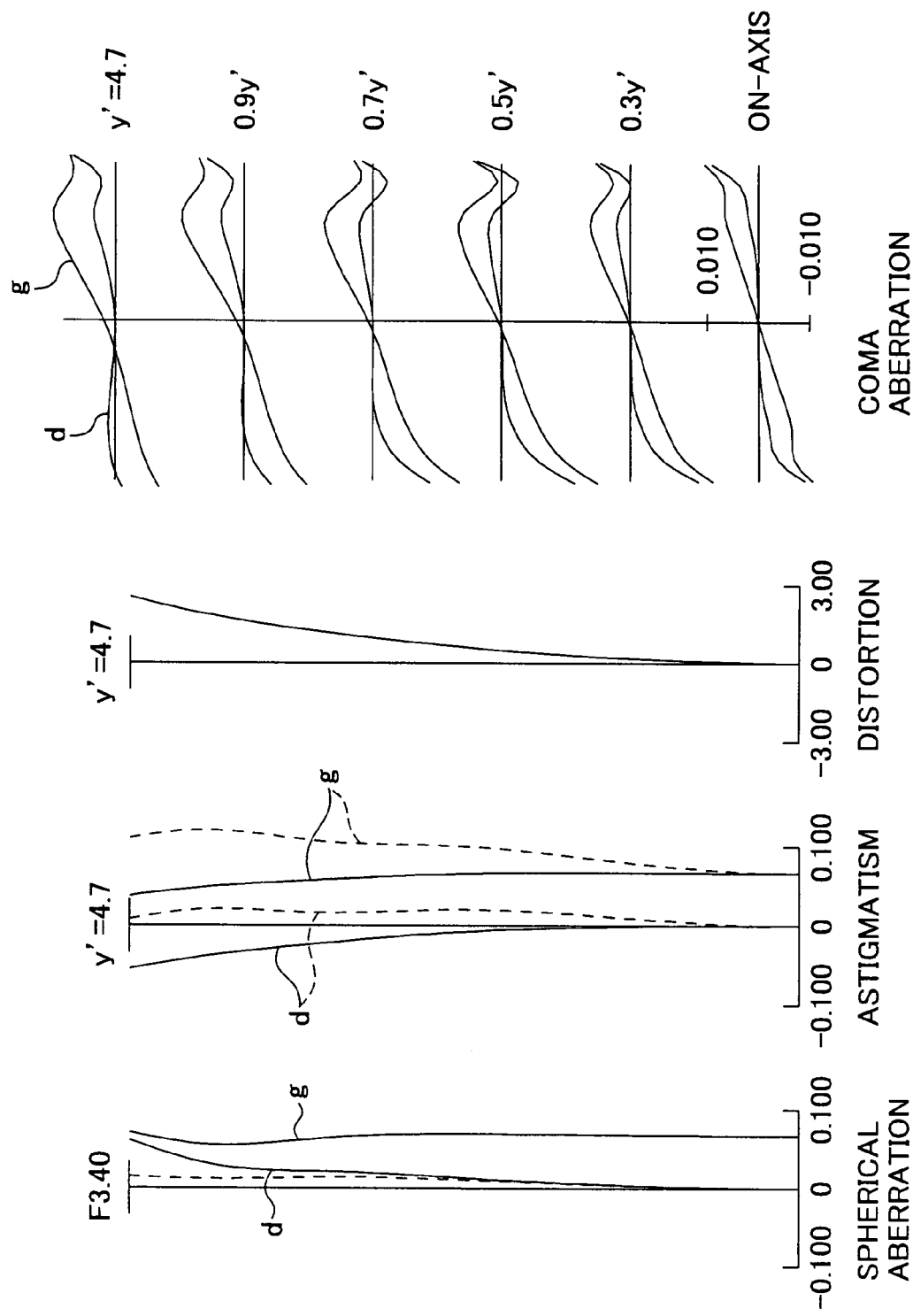
FIG. 10 is an aberration curve chart in a long focal end of the zoom lens installed in the image-taking device of the second embodiment.

FIG. 8 illustrates an aberration curve chart in the short focal end of the zoom lens of the second embodiment. FIG. 9 illustrates an aberration curve chart in the middle focal length of the zoom lens of the second embodiment. FIG. 10 illustrates an aberration curve chart in the long focal end of the zoom lens of the second embodiment.

Figure 11:
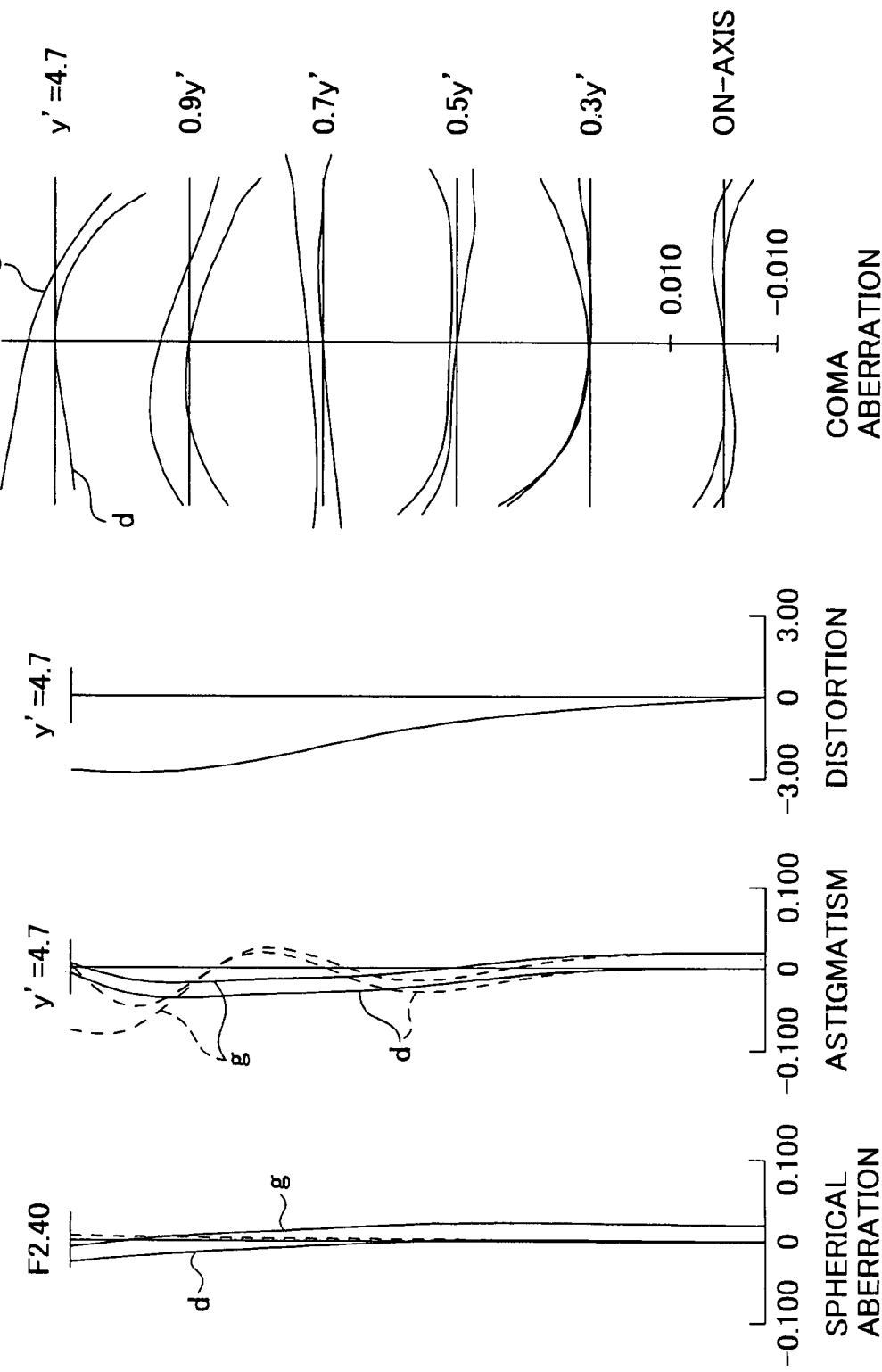
FIG. 11 is an aberration curve chart in a short focal end of the zoom lens installed in the image-taking device of the third embodiment.
Figure 12:
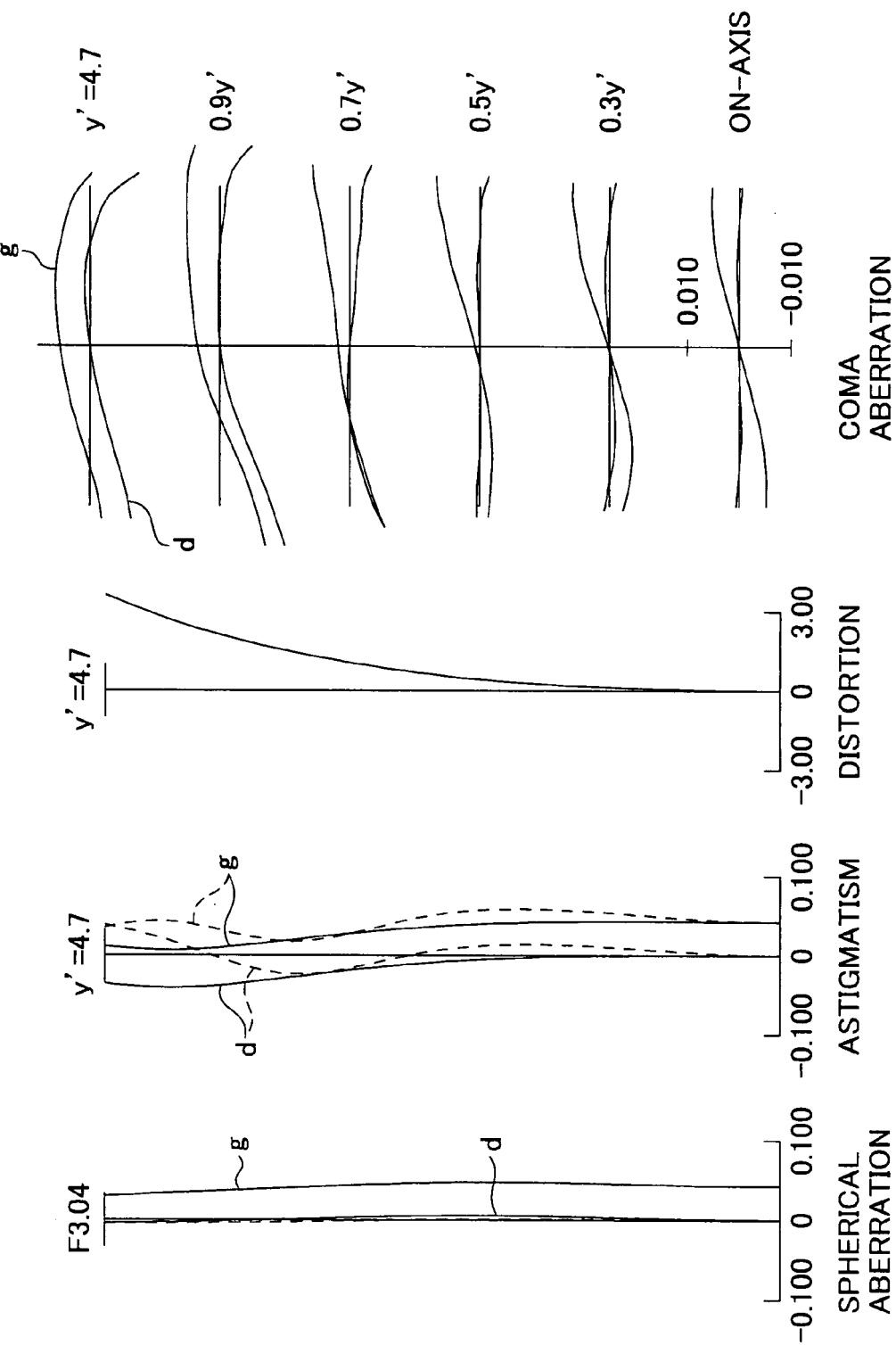
FIG. 12 is an aberration curve chart in a middle focal length of the zoom lens installed in the image-taking device of the third embodiment.
Figure 13:
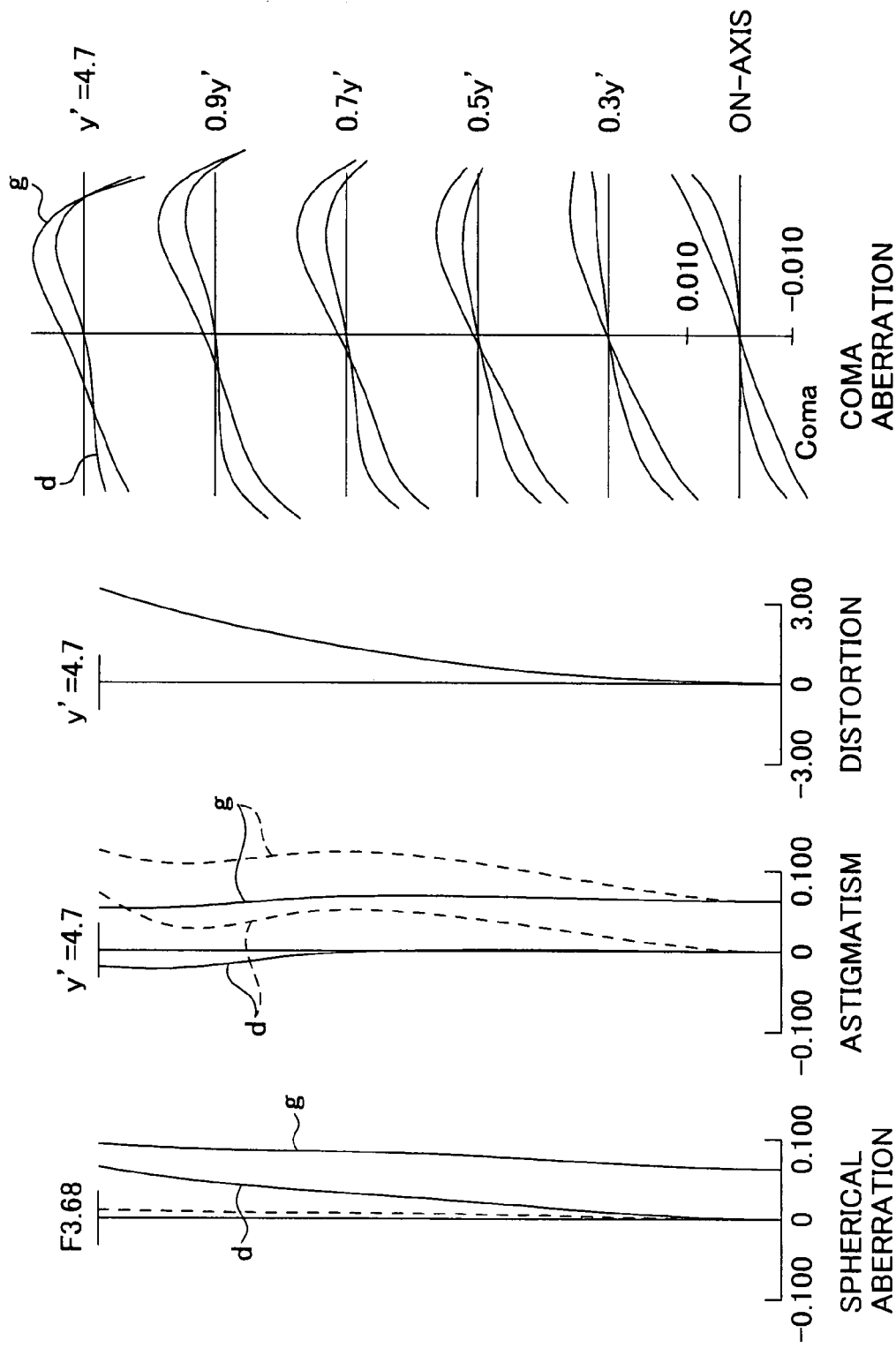
FIG. 13 is an aberration curve chart in a long focal end of the zoom lens installed in the image-taking device of the third embodiment.

FIG. 11 illustrates an aberration curve chart in the short focal end of the zoom lens of the third embodiment. FIG. 12 illustrates an aberration curve chart in the middle focal length of the zoom lens of the third embodiment. FIG. 13 illustrates an aberration curve chart in the long focal end of the zoom lens of the third embodiment.

Figure 14:
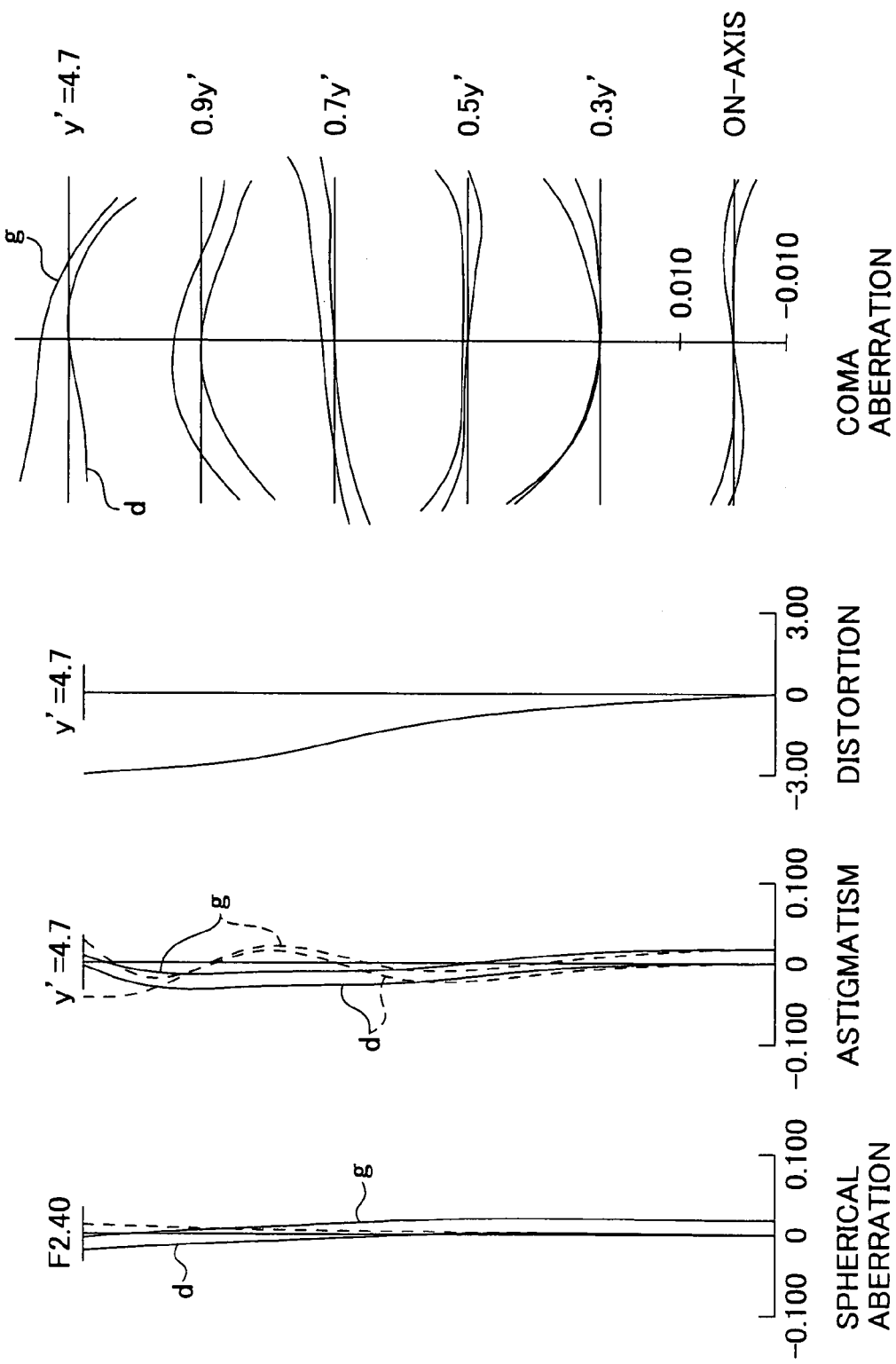
FIG. 14 is an aberration curve chart in a short focal end of the zoom lens installed in the image-taking device of the fourth embodiment.
Figure 15:
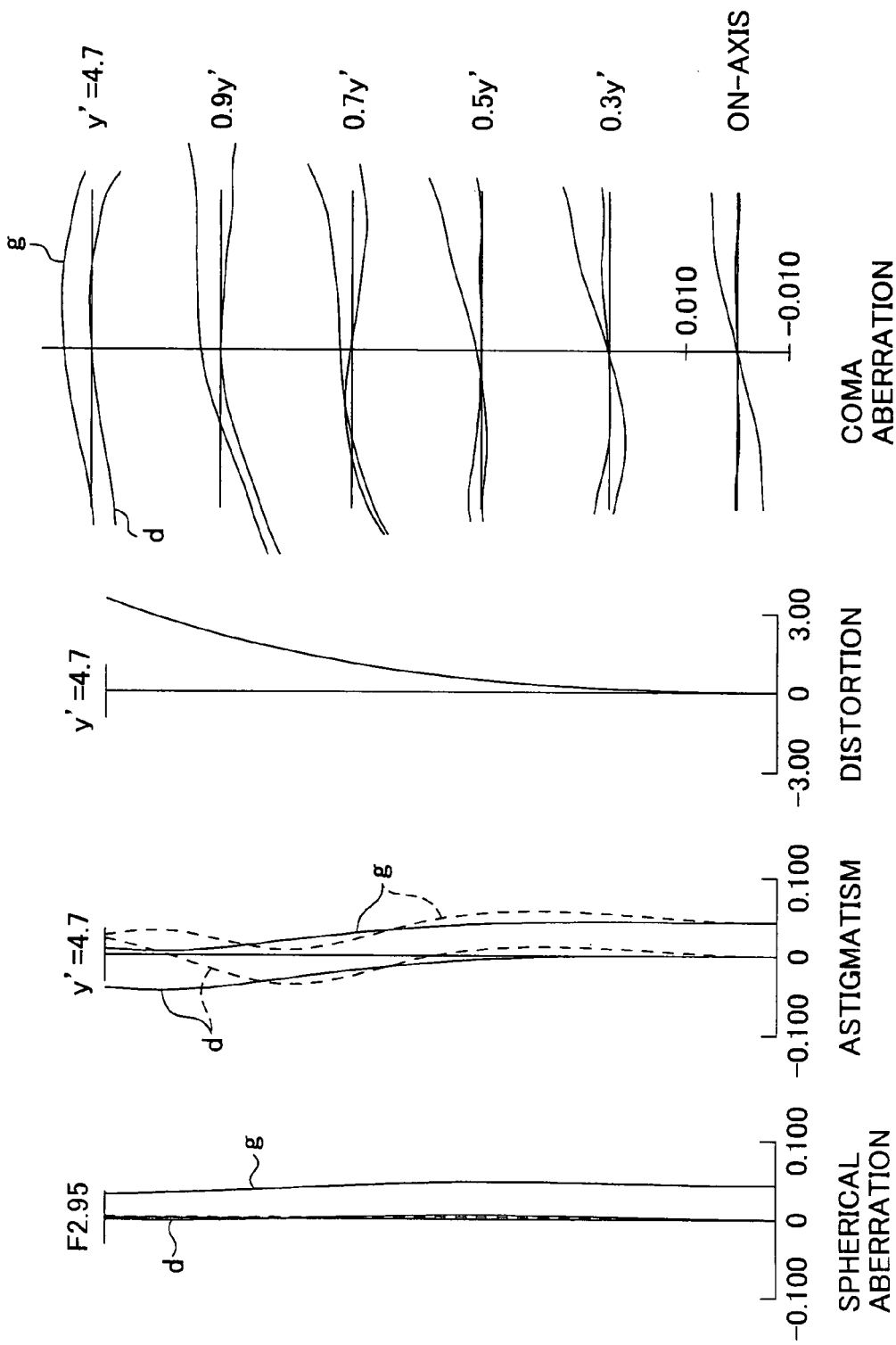
FIG. 15 is an aberration curve chart in a middle focal length of the zoom lens installed in the image-taking device of the fourth embodiment.
Figure 16:
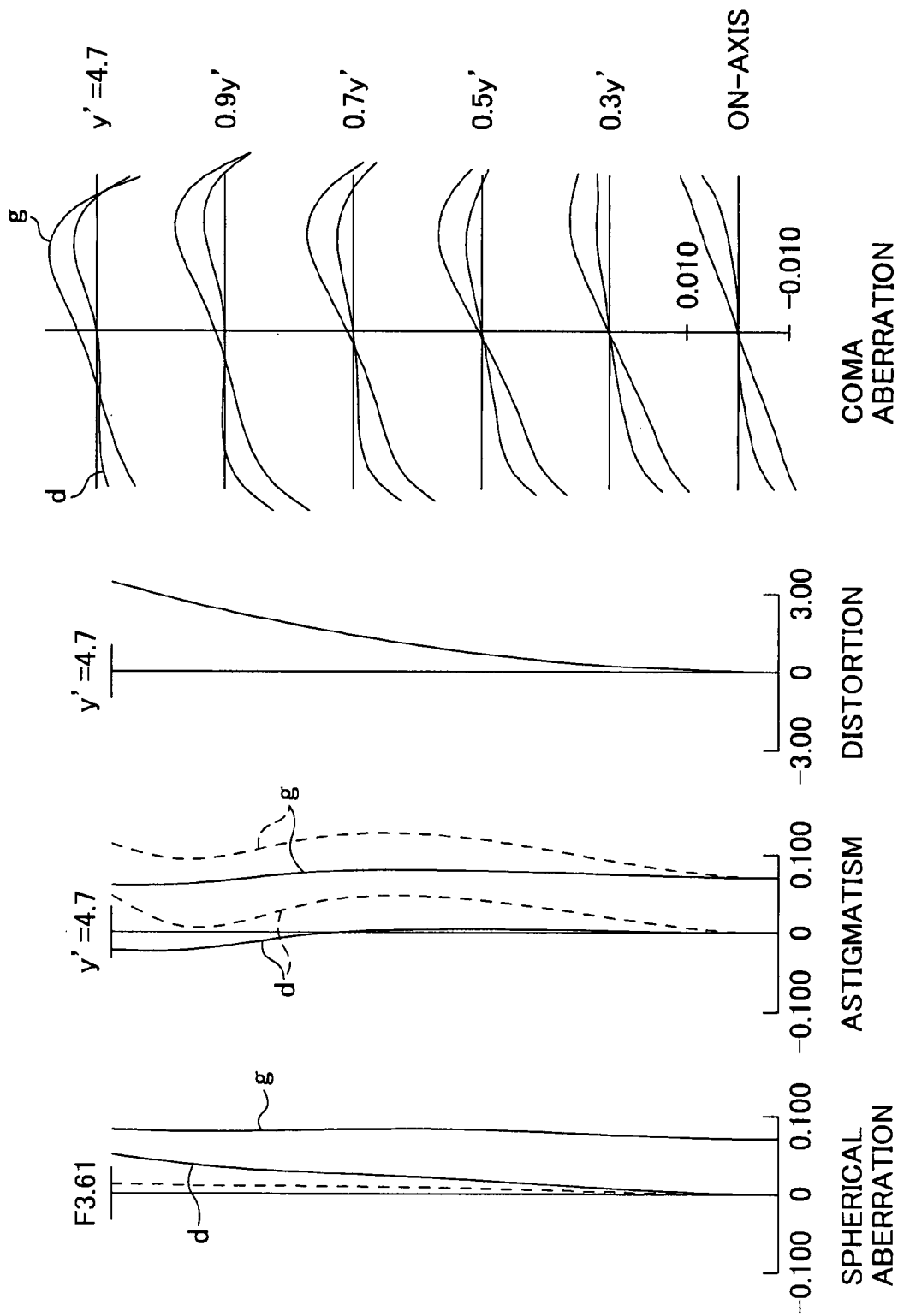
FIG. 16 is an aberration curve chart in a long focal end of the zoom lens installed in the image-taking device of the fourth embodiment.

FIG. 14 illustrates an aberration curve chart in the short focal end of the zoom lens of the fourth embodiment. FIG. 15 illustrates an aberration curve chart in the middle focal length of the zoom lens of the fourth embodiment. FIG. 16 illustrates an aberration curve chart in the long focal end of the zoom lens of the fourth embodiment.

A broken line of a spherical aberration illustrates a sine condition in each of the aberration curve charts illustrated in FIGS. 5-16. A solid line in a figure of an astigmatism is sagital, and the broken line illustrates meridional.

As obvious from the aberration curve charts shown in the FIGS. 5-16, it is revealed that it is possible to obtain an excellent characteristic by each of the embodiments.

Thus, the image-taking device in the present embodiment installs the zoom lens which includes sequentially from the object side of the zoom lens: the first lens group G1 with the positive focal length; the second lens group G2 with the negative focal length; the aperture stop FA arranged on the object side of the third lens group G3; the third lens group G3 with the positive focal length; the fourth lens group G4 with the positive focal length. By zooming from the short focal end to the long focal end, the interval between the first lens group G1 and the second lens group G2 increases, the interval between the second lens group G2 and the third lens group G3 decreases, the interval between the third lens group G3 and the fourth lens group G4 increases. The first lens group includes from the object side of the first lens group sequentially: the negative meniscus lens L1 having a convex surface facing the object side; and the positive lens L2. The first lens group G1 is configured to satisfy a conditional expression: Nd11>1.96 (Nd11: a refractive index of the negative meniscus lens L1), so that it is possible for the image-taking device to correspond to the wide angle of field where the half field angle is 38 degrees or more and 2.5 or less in F number in the short focal end.

Fifth Embodiment

Next, the 5th embodiment will be explained.

The 5th embodiment is one characterized by installing the zoom lens of the first to 4th embodiment into a camera device. Thus, it is possible to obtain a small and high-resolution camera device which can correspond to a wide angel of field of 38 degrees or more in a half field angle, and to 2.5 or less in F number. Therefore, it is possible for a user to take a high-resolution image by the camera device that makes it easy to take anywhere. Hereafter, the camera device of the 5th embodiment will be explained by referring to FIGS. 17A and 17B.

Figure 17A:
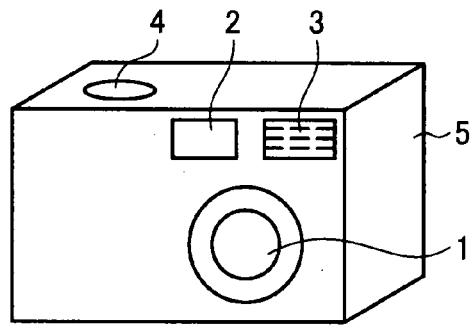
Figure 17B:
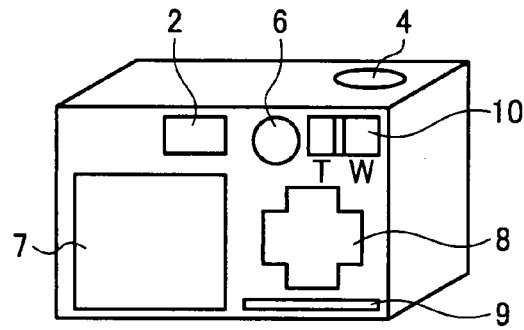

First, a composition of the camera device in the 5th embodiment will be explained by referring to FIGS. 17A and 17B. FIG. 17A is illustrating a front side view and an upper surface view, and FIG. 17B is illustrating a back side view.

The camera device in the 5th embodiment includes the follows as illustrated in FIG. 17: a photographing lens 1; a viewfinder 2; a flash 3; shutter button 4; a case 5; a power on/off switch 6; a liquid crystal monitor 7; an operation button 8; a memory card slot 9; a zoom switch 10.

Each of the zoom lenses that are explained in the first-4th embodiments will be applied as the "photographing lens 1" to the camera device in the 5th embodiment.

Thus, since the zoom lens explained in the first-4th embodiments is applied to the camera device in the 5th embodiment as a zoom lens for photographing a picture, so that it is possible to obtain a small and high-resolution camera device which can correspond to the wide angel of field of 38 degrees or more in the half field angle and to 2.5 or less in F number, whereby it is possible for the user to take the high-resolution image with the camera device that makes it easy to take anywhere.

Sixth Embodiment

Next, it will be explained on the 6th embodiment.

The 6th embodiment is one characterized by installing the zoom lens in the first to 4th embodiment into a camera device. Thus, it is possible to obtain a small and high-resolution camera device which can correspond to a wide angel of field of 38 degrees or more in a half field angle, and to 2.5 or less in F number. Therefore, it is possible for a user to take a high-resolution image by the camera device that makes it easy to take anywhere. Hereafter, the camera device of the 6th embodiment will be explained by referring to FIG. 18.

Figure 18:
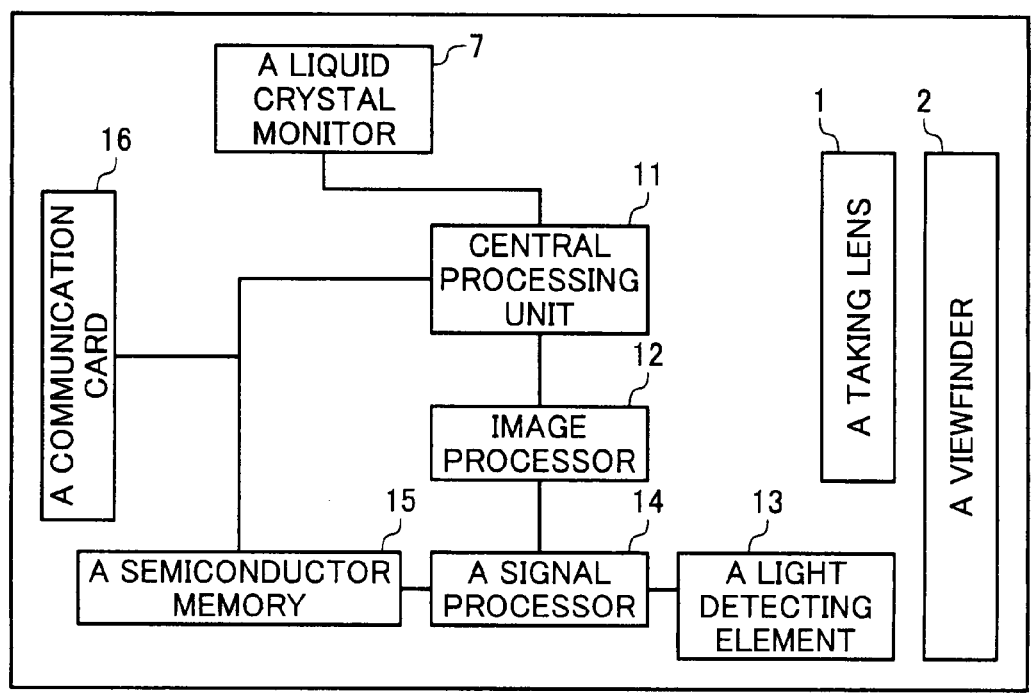
FIG. 18 is a view illustrating a composition of the camera device in the 6th embodiment, and illustrating a system structure of the camera device.

The camera device in the 6th embodiment includes as illustrated in FIG. 18: a photographing lens 1; a viewfinder 2; a liquid crystal monitor 7; a central processing unit 11; an image processor 12; a light detecting element 13; a signal processor 14; a semiconductor memory 15; a communication card 16.

The camera device in the 6th embodiment is configured to read an image of a picture object, which is taken and formed by the photographing lens 1, using the light detecting element 13. An image signal output from the light detecting element 13 is processed with the signal processor 14 that receives a control of the central processing unit 11, and then is converted into digital information. Therefore, it means the camera device in the 6th embodiment has "a function to convert a photographic image to digital information".

Each of the zoom lenses (embodiments first-fourth) that are explained in the first-4th embodiments will be applied as "zoom lens for taking a picture" to the camera device in the 6th embodiment as the photographing lens 1. Therefore, it is possible to correspond to the wide angel of field of 38 degrees or more in the half field angle, and to 2.5 or less in F number, and to obtain a high-resolution camera device with the light detecting element 13 of three million pixels or more, and it is possible for the user to take the high-resolution image with the camera device that makes it easy to take anywhere.

The embodiments mentioned above are suitable embodiments of this invention. These embodiments are not to limit a range of the present invention only in the above-mentioned embodiments. It is possible to perform other embodiments which have various changes within a range which doesn't deviate from the summary of the present invention.

The zoom lens and the image-taking device that according to the present invention can be applied to a digital camera, a portable terminal device, a video camera, and a silver salt camera, etc. Although the preferred embodiments of the present invention have been mentioned, it should be noted that the present invention is not limited to these embodiments, various modifications and changes can be made to the embodiments.

CROSS-REFERENCE TO THE RELATED APPLICATION

This application is based on and claims priority from Japanese Patent Application No. 2006-052862, filed on Feb. 28, 2006, the disclosure of which is incorporated herein by reference in its entirety.

What is claimed is:

1. A zoom lens, comprising:
a first lens group having a positive focal length;
a second lens group having a negative focal length;
a third lens group having a positive focal length;
a fourth lens group having a positive focal length,
the first to fourth lens groups being disposed in sequence from an object side of the zoom lens; and
an aperture stop being disposed in a side facing an object of the third lens group,
wherein when zooming from a short focal end to a long focal end, an interval between the first and second lens groups increases, an interval between the second and third lens groups decreases, and an interval between the third and fourth lens groups increases,
wherein the first lens group comprises a negative meniscus lens L1 having a convex surface facing the object and a positive lens L2, which are disposed in sequence from the object side,
wherein a conditional expression: Nd11>1.96 is satisfied where Nd11 is a refractive index of the negative meniscus lens.

2. The zoom lens according to claim 1, wherein the negative meniscus lens L1 and the positive lens L2 are formed in a cemented lens.

3. The zoom lens according to claim 1, wherein a conditional expression: $1.5<\beta 3t/\beta 3w<2.5$ ($\beta 3t$ is a transverse magnification of the third lens group in the long focal end, and $\beta 3w$ is a transverse magnification of the third lens group in the short focal end) is satisfied.

4. The zoom lens according to claim 1, wherein the second lens group has a negative lens L3 on the object side of the second lens group and satisfies a conditional expression: Nd21>1.75 (Nd21 is a refractive index of negative lens L3).

5. The zoom lens according to claim 4, comprising:
a negative lens L4; and
a positive lens L5;
the negative lenses L3, L4 and the positive lens L5 are disposed in sequence from the object side of the second lens group,
wherein a conditional expression: 0.75<(R221−R232)/(R221+R232)<−0.45 (R221 is a curvature radius on the object side of negative lens L4, and R232 is a curvature radius on an image side of positive lens L5) is satisfied.

6. The zoom lens according to claim 5, wherein the negative lens L4 and the positive lens L5 are formed as a cemented lens.

7. The zoom lens according to claim 1, wherein a conditional expression 6.5<fl/fw<9.5 (fl is a focal length of the first lens group, and fw is a focal length on the short focal end) is satisfied.

8. The zoom lens according to claim 1, wherein the zooming from the short focal end to the long focal end, and first and third lens groups move to the object side of the zoom lens.

9. An image-taking device, which includes the zoom lens set forth in claim 1 as an optics system lens for taking picture.

* * * * *